US012316964B2

(12) United States Patent
Fukuda

(10) Patent No.: US 12,316,964 B2
(45) Date of Patent: May 27, 2025

(54) IMAGING APPARATUS AND IMAGING METHOD

(71) Applicant: SONY GROUP CORPORATION, Tokyo (JP)

(72) Inventor: Akira Fukuda, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/310,721

(22) Filed: May 2, 2023

(65) Prior Publication Data

US 2023/0269471 A1  Aug. 24, 2023

Related U.S. Application Data

(63) Continuation of application No. 17/220,572, filed on Apr. 1, 2021, now Pat. No. 11,659,277, which is a
(Continued)

(30) Foreign Application Priority Data

Sep. 24, 2013 (JP) ................................. 2013-197389

(51) Int. Cl.
H04N 23/67 (2023.01)
G02B 7/36 (2021.01)
(Continued)

(52) U.S. Cl.
CPC ........... *H04N 23/675* (2023.01); *G02B 7/365* (2013.01); *G03B 13/36* (2013.01); *G06F 18/24* (2023.01);
(Continued)

(58) Field of Classification Search
CPC .... H04N 23/675; H04N 23/61; H04N 23/611; H04N 23/63; H04N 23/635; H04N 23/67;
(Continued)

(56) References Cited

U.S. PATENT DOCUMENTS 5,283,607 A  2/1994 Suzuki et al.
8,102,465 B2  1/2012 Nakao et al.
(Continued)

FOREIGN PATENT DOCUMENTS

JP  01-121809 A  5/1989
JP  2003-107335 A  4/2003
(Continued)

OTHER PUBLICATIONS

Office Action for JP Patent Application No. 2021-139835, issued on Jul. 5, 2022, 04 pages of English Translation and 03 pages of Office Action.
(Continued)

Primary Examiner — Abdelaaziz Tissire
(74) Attorney, Agent, or Firm — CHIP LAW GROUP

(57) ABSTRACT

The present disclosure relates to an imaging apparatus and an imaging method that are capable of easily setting a type of a subject as a focusing target in each imaging. An image sensor acquires an image. An operation unit selects a type of a subject as a focusing target in each imaging of the image acquired by the image sensor. In the case where the type of the subject as a focusing target is selected by the operation unit, a microcomputer detects an area of the subject of that type from the image and sets the detected area as an in-focus area of the image. The present disclosure can be applied to an imaging apparatus, for example.

15 Claims, 16 Drawing Sheets

Related U.S. Application Data continuation of application No. 16/574,162, filed on Sep. 18, 2019, now Pat. No. 10,972,652, which is a continuation of application No. 15/022,145, filed as application No. PCT/JP2014/074241 on Sep. 12, 2014, now Pat. No. 10,440,252.

(51) Int. Cl.

| | | |
|---|---|---|
| G03B 13/36 | (2021.01) | |
| G06F 18/24 | (2023.01) | |
| H04N 23/61 | (2023.01) | |
| H04N 23/611 | (2023.01) | |
| H04N 23/63 | (2023.01) | |

(52) U.S. Cl.
CPC .......... *H04N 23/61* (2023.01); *H04N 23/611* (2023.01); *H04N 23/63* (2023.01); *H04N 23/635* (2023.01); *H04N 23/67* (2023.01); *H04N 23/672* (2023.01)

(58) Field of Classification Search
CPC ...... H04N 23/672; G02B 7/365; G03B 13/36; G06F 18/24
See application file for complete search history.

(56) References Cited

U.S. PATENT DOCUMENTS

| | | | |
|---|---|---|---|
| 8,934,040 | B2 | 1/2015 | Okazawa |
| 10,440,252 | B2 * | 10/2019 | Fukuda ................ H04N 23/611 |
| 10,972,652 | B2 * | 4/2021 | Fukuda .................. H04N 23/61 |
| 2003/0071908 | A1 * | 4/2003 | Sannoh ................ H04N 23/635 |
| | | | 348/E5.038 |
| 2005/0024516 | A1 * | 2/2005 | Fish ...................... H04N 23/611 |
| | | | 348/333.03 |
| 2006/0012702 | A1 | 1/2006 | Kawahara et al. |
| 2006/0115157 | A1 | 6/2006 | Mori et al. |
| 2006/0125926 | A1 | 6/2006 | Nishino |
| 2007/0019081 | A1 | 1/2007 | Nakashima |
| 2007/0171296 | A1 | 7/2007 | Tsukiji et al. |
| 2008/0074529 | A1 | 3/2008 | Terashima |
| 2008/0187187 | A1 | 8/2008 | Tezuka |
| 2008/0205870 | A1 | 8/2008 | Ueda |
| 2009/0046165 | A1 * | 2/2009 | Kato ...................... H04N 9/643 |
| | | | 348/222.1 |
| 2009/0060274 | A1 | 3/2009 | Kita |
| 2009/0066817 | A1 | 3/2009 | Sakamaki |
| 2009/0091633 | A1 | 4/2009 | Tamaru |
| 2009/0284645 | A1 | 11/2009 | Nozaki et al. |
| 2010/0066847 | A1 | 3/2010 | Suzuki et al. |
| 2010/0128144 | A1 | 5/2010 | Tay |
| 2010/0134642 | A1 | 6/2010 | Thorn |
| 2010/0245614 | A1 | 9/2010 | Matsunaga |
| 2011/0007177 | A1 | 1/2011 | Kang |
| 2011/0019066 | A1 | 1/2011 | Takano et al. |
| 2011/0115967 | A1 * | 5/2011 | Lee ...................... H04N 23/676 |
| | | | 348/E5.045 |
| 2011/0141334 | A1 | 6/2011 | Kuriyama |
| 2011/0242395 | A1 | 10/2011 | Yamada et al. |
| 2011/0261219 | A1 | 10/2011 | Suzuki et al. |
| 2012/0002067 | A1 | 1/2012 | Fukata |
| 2012/0013786 | A1 | 1/2012 | Yasuda et al. |
| 2012/0057062 | A1 | 3/2012 | Hamada et al. |
| 2012/0057786 | A1 | 3/2012 | Yano |
| 2012/0105676 | A1 | 5/2012 | Park |
| 2012/0147252 | A1 * | 6/2012 | Kunishige ............. H04N 23/667 |
| | | | 348/E5.045 |
| 2013/0016268 | A1 | 1/2013 | Nakata |
| 2013/0093939 | A1 | 4/2013 | Takanashi |
| 2014/0081956 | A1 | 3/2014 | Yuki |
| 2014/0104483 | A1 * | 4/2014 | Kunishige ............. H04N 23/635 |
| | | | 348/349 |
| 2014/0210956 | A1 | 7/2014 | Mori |
| 2016/0125221 | A1 | 5/2016 | Kim et al. |
| 2016/0173759 | A1 | 6/2016 | Nakamura |
| 2017/0118404 | A1 | 4/2017 | Song |
| 2017/0118405 | A1 | 4/2017 | Song |
| 2018/0063419 | A1 | 3/2018 | Kitaya et al. |
| 2018/0239108 | A1 | 8/2018 | Ishii et al. |
| 2018/0348470 | A1 | 12/2018 | Suzuki et al. |
| 2019/0116311 | A1 | 4/2019 | Sato |
| 2019/0116312 | A1 * | 4/2019 | Funatsu ............... H04N 23/663 |
| 2019/0116318 | A1 | 4/2019 | Ogawa |

FOREIGN PATENT DOCUMENTS

| | | | |
|---|---|---|---|
| JP | 2007-174149 A | | 7/2007 |
| JP | 2007214845 A | | 8/2007 |
| JP | 2009-118009 A | | 5/2009 |
| JP | 2010186098 A | | 8/2010 |
| JP | 2012-048157 A | | 3/2012 |
| JP | 2012163588 A | * | 8/2012 |
| JP | 2012-231200 A | | 11/2012 |
| JP | 2013-160925 A | | 8/2013 |
| JP | 2014-056169 A | | 3/2014 |

OTHER PUBLICATIONS

Office Action for JP Patent Application No. 2020-011381 issued on Jan. 5, 2021, 03 pages of Office Action and 03 pages of English Translation.

Non-Final Office Action for U.S. Appl. No. 15/022,145, issued on Feb. 27, 2017, 12 pages.

Non-Final Office Action for U.S. Appl. No. 15/022,145, issued on Mar. 21, 2018, 14 pages.

Non-Final Office Action for U.S. Appl. No. 15/022,145, issued on Jan. 9, 2019, 14 pages.

Final Office Action for U.S. Appl. No. 15/022,145, issued on Oct. 3, 2017, 13 pages.

Final Office Action for U.S. Appl. No. 15/022,145, issued on Sep. 14, 2018, 12 pages.

Advisory Action for U.S. Appl. No. 15/022,145, issued on Dec. 19, 2017, 03 pages.

Advisory Action for U.S. Appl. No. 15/022,145, issued on Dec. 11, 2018, 03 pages.

Notice of Allowance for U.S. Appl. No. 15/022,145, issued on May 28, 2019, 09 pages.

International Search Report and Written Opinion of PCT Application No. PCT/JP2014/074241, issued on Dec. 16, 2014, 05 pages of English Translation and 05 pages of ISRWO.

International Preliminary Report on Patentability of PCT Application No. PCT/JP2014/074241, issued on Apr. 7, 2016, 06 pages of English Translation and 03 pages of IPRP.

Office Action for JP Patent Application No. 2015-539109, issued on Nov. 28, 2019, 02 pages of Office Action and 01 pages of English Translation.

Office Action for EP Patent Application No. 14848520.4, issued on Dec. 11, 2019, 04 pages of Office Action.

Non-Final Office Action for U.S. Appl. No. 16/574,162, issued on Jun. 25, 2020, 11 pages.

Notice of Allowance for U.S. Appl. No. 16/574,162, issued on Mar. 9, 2021, 6 pages.

Notice of Allowance for U.S. Appl. No. 16/574,162, issued on Dec. 10, 2020, 8 pages.

Notice of Allowance for U.S. Appl. No. 17/220,572, issued on Jan. 19, 2023, 10 pages.

Non-Final Office Action for U.S. Appl. No. 17/220,572, issued on Feb. 14, 2022, 18 pages.

Final Office Action for U.S. Appl. No. 17/220,572, issued on Sep. 21, 2022, 17 pages.

\* cited by examiner

| Face detection mode | Face detection | Face frame display |
|---|---|---|
| Face detection OFF mode | ○ | × |
| Registered face detection mode | ○ (Registered face priority) | ○ |
| Face detection ON mode | ○ | ○ |
| Smile shutter mode | ○ | ○ |

FIG.7

| Face detection mode | Press of center button of cross key | Half-press of release button |
|---|---|---|
| Face detection OFF mode | Pupil area | Predetermined area |
| Registered face detection mode | Pupil area | Face area |
| Face detection ON mode | Pupil area | Face area |
| Smile shutter mode | Face area | Face area |

IMAGING APPARATUS AND IMAGING METHOD

CROSS REFERENCE TO RELATED APPLICATIONS

The present application is a continuation application of U.S. patent application Ser. No. 17/220,572, filed on Apr. 1, 2021, which is a continuation application of U.S. patent application Ser. No. 16/574,162, filed on Sep. 18, 2019 (now U.S. Pat. No. 10,972,652 issued Apr. 6, 2021), which is a continuation application of U.S. patent application Ser. No. 15/022,145, filed on Mar. 15, 2016 (now U.S. Pat. No. 10,440,252 issued Oct. 8, 2019), which is a National Phase Patent Application of International Application No. PCT/JP2014/074241 filed on Sep. 12, 2014, and which claims priority from Japanese Patent Application JP 2013-197389 filed on Sep. 24, 2013. Each of the above referenced applications is hereby incorporated by reference in its entirety.

TECHNICAL FIELD

The present disclosure relates to an imaging apparatus, an imaging method, and a program, and particularly to, an imaging apparatus, an imaging method, and a program that are capable of easily setting a type of a subject as a focusing target in each imaging.

BACKGROUND ART

Imaging apparatuses have a function of detecting a specific subject such as a human face within an image and bringing the subject into focus (see, for example, Patent Document 1).
Patent Document 1: Japanese Patent Application Laid-open No. 2009-118009

SUMMARY OF INVENTION

Problem to be Solved by the Invention

However, a type of a subject as a focusing target could not be easily set in each imaging.
The present disclosure has been made in view of such circumstances and is capable of easily setting a type of a subject as a focusing target in each imaging.

Means for Solving the Problem

According to an aspect of the present disclosure, there is provided an imaging apparatus including: an acquisition unit that acquires an image; a first selection unit that selects a first type of a subject as a focusing target in each imaging of the image acquired by the acquisition unit; a first detection unit that detects an area of the subject of the first type from the image in a case where the first type is selected by the first selection unit; and an area setting unit that sets the area detected by the first detection unit as an in-focus area of the image.

According to an aspect of the present disclosure, there are provided an imaging method and a program that correspond to the imaging apparatus according to one aspect of the present disclosure.

In one aspect of the present disclosure, an image is acquired, a first type of a subject as a focusing target is selected in each imaging of the image, an area of the subject of the first type is detected from the image in a case where the first type is selected, and the area is set as an in-focus area of the image.

Effects of the Invention

According to one aspect of the present disclosure, imaging can be performed with a subject being in focus. Further, according to one aspect of the present disclosure, a type of a subject as a focusing target can be easily set in each imaging.

It should be noted that effects described herein are not necessarily limited and any one of the effects described herein may be produced.

BRIEF DESCRIPTION OF DRAWINGS

FIG. 7 is a diagram for describing a relationship between a face detection mode and face frame display.

FIG. 8 is a diagram for describing a relationship between a face detection mode and an in-focus area.

FIG. 10 is a diagram for describing display in a face detection ON mode.

MODE(S) FOR CARRYING OUT THE INVENTION

First Embodiment (Outer Appearance Configuration Example of First Embodiment of Imaging Apparatus)

Figure 1:
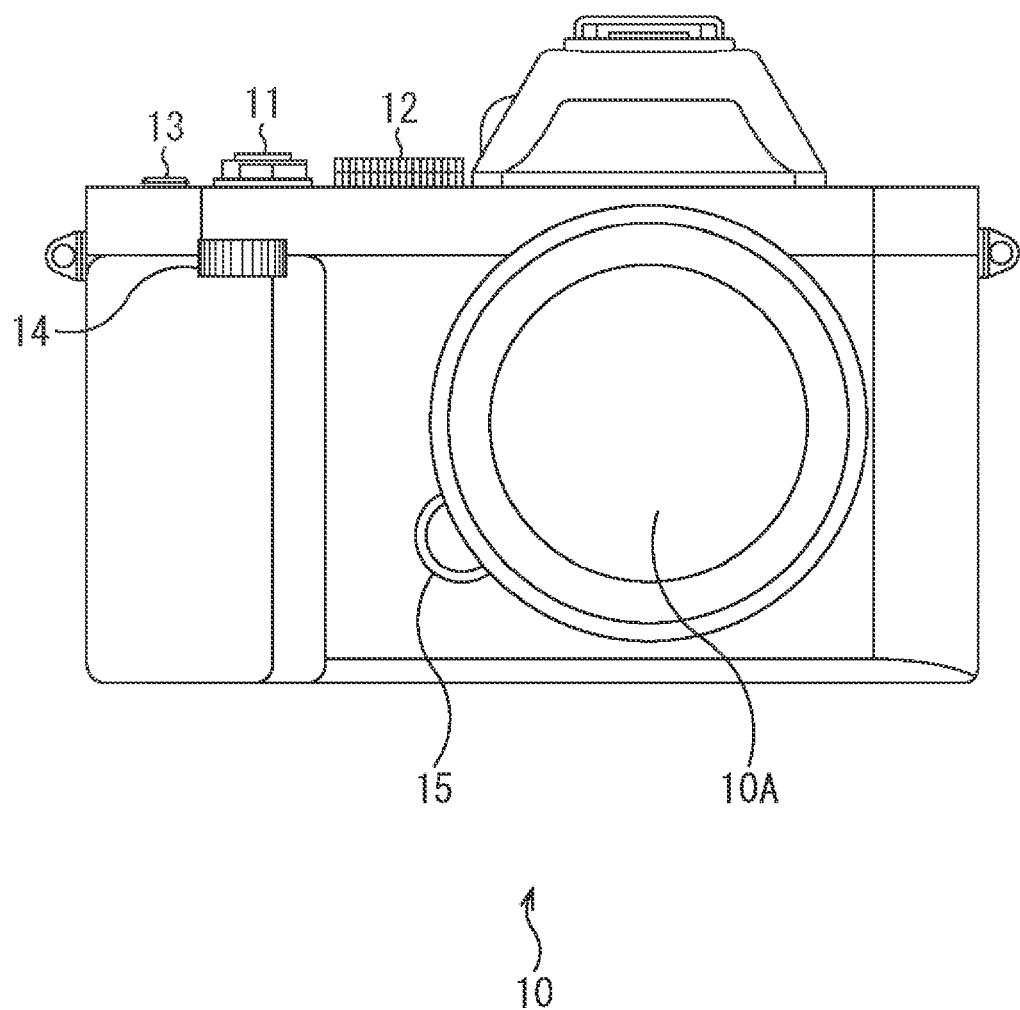
FIG. 1 is a front view showing an outer appearance configuration example of a first embodiment of an imaging apparatus to which the present disclosure is applied.
Figure 2:
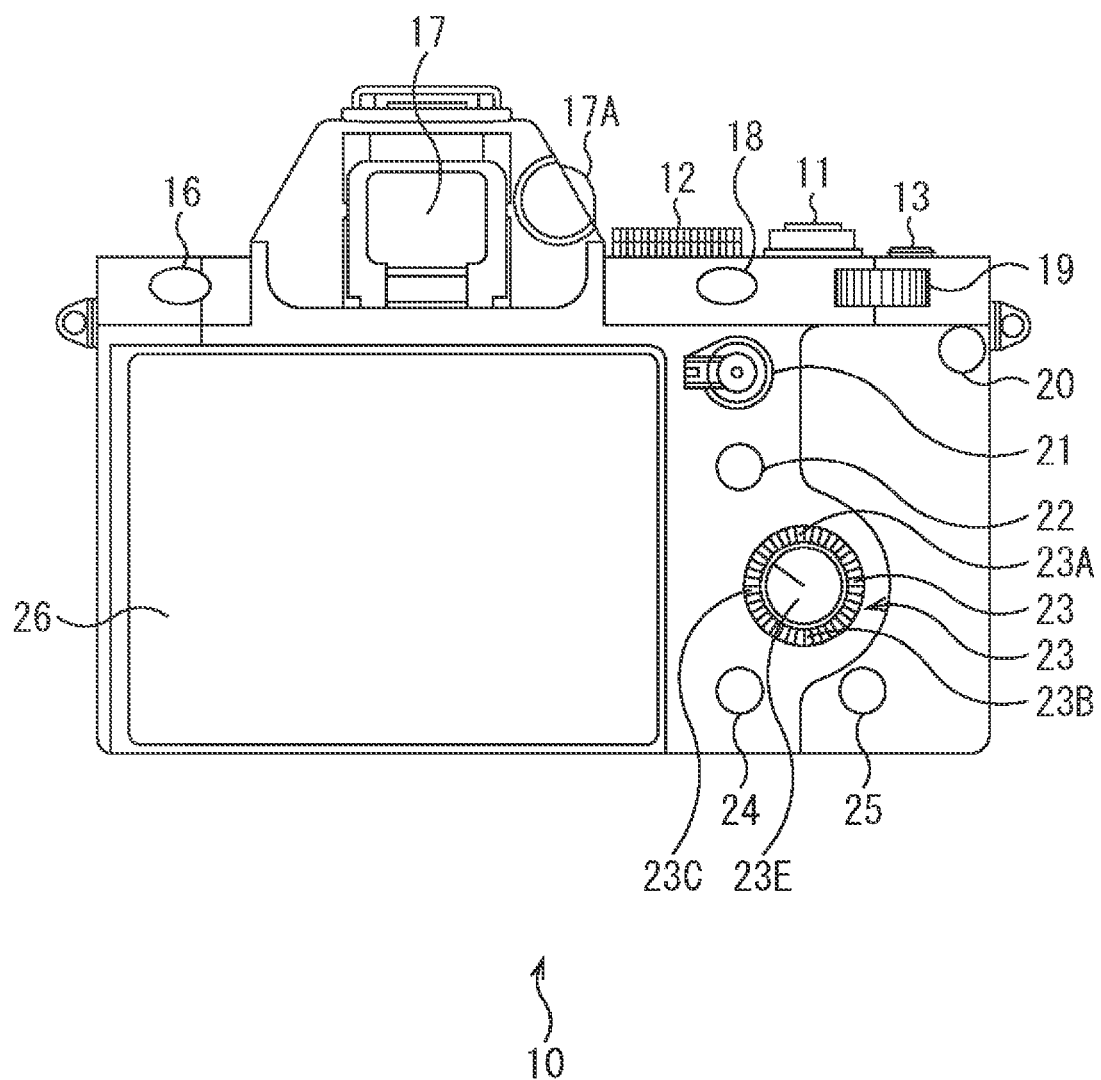
FIG. 2 is a back view showing an outer appearance configuration example of the imaging apparatus of FIG. 1.
Figure 3:
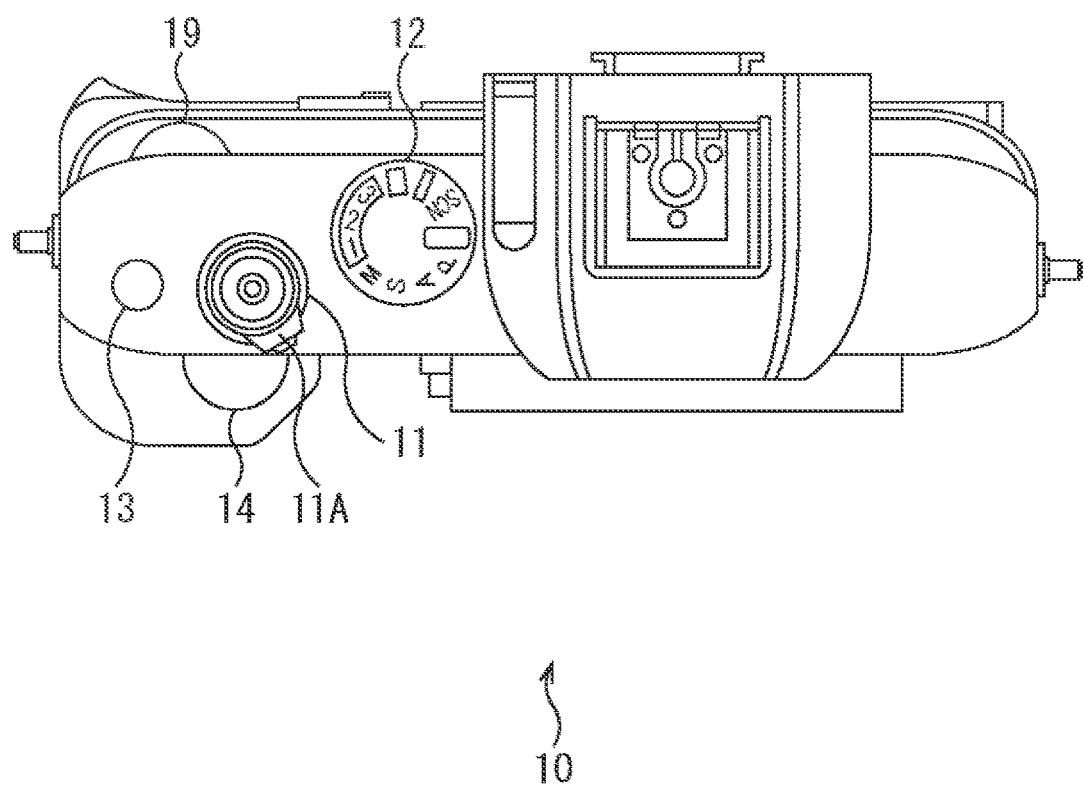
FIG. 3 is a top view showing an outer appearance configuration example of the imaging apparatus of FIG. 1.

FIGS. 1 to 3 are views each showing an outer appearance configuration example of a first embodiment of an imaging apparatus to which the present disclosure is applied. FIG. 1 is a front view of the imaging apparatus. FIG. 2 is a back view of the imaging apparatus. FIG. 3 is a top view of the imaging apparatus.

It should be noted that in this specification, a surface on which a lens of the imaging apparatus is disposed is a front surface, and a surface opposed to the front surface is a back surface. Further, a direction perpendicular to the front surface and the back surface is a depth direction.

As shown in FIG. 1, a lens 10A is disposed on the front surface of an imaging apparatus 10 at the center of the right side when viewed from a subject. The lens 10A collects light from the subject.

Further, as shown in FIGS. 1 to 3, a release button 11 is disposed on the top surface of the imaging apparatus 10 on the left side when viewed from the subject. The release button 11 is full pressed when imaging is performed. Further, the release button 11 is half pressed when a predetermined area within an image (for example, a center area of the image, an area of the subject in which a position in the depth direction is closest to the imaging apparatus 10, or the like) is brought into focus. As shown in FIG. 3, the release button 11 is provided with a power button 11A. The power button 11A is operated when the power of the imaging apparatus 10 is turned on.

As shown in FIGS. 1 to 3, on the top surface of the imaging apparatus 10, additionally, a mode dial 12 is disposed on the right side of the release button 11 and a custom button 13 is disposed on the left side thereof when viewed from the subject. The mode dial 12 is operated when an imaging mode is selected. The custom button 13 is a button to which a user can assign a desired function.

As shown in FIGS. 1 and 3, a front dial 14 is disposed on the front surface of the imaging apparatus 10 on the upper left side of the lens 10A when viewed from the subject. The front dial 14 is operated when a shutter speed is adjusted, for example.

As shown in FIG. 1, a lens lock button 15 is disposed adjacently to the lens 10A on the front surface of the imaging apparatus 10. The lens lock button 15 is operated when the lens 10A is removed from the imaging apparatus 10.

As shown in FIG. 2, a menu button 16 is disposed on the back surface of the imaging apparatus 10 on the upper left side toward the subject. The menu button 16 is pressed when a menu screen is displayed.

Further, as shown in FIG. 2, a finder 17 is disposed on the back surface of the imaging apparatus 10 on the upper right side of the menu button 16 toward the subject, and a diopter adjusting dial 17A is disposed on the right side of the finder 17 toward the subject. The finder 17 is a liquid crystal panel for confirming the subject when imaging is performed.

The diopter adjusting dial 17A is operated when the diopter of the finder 17 is adjusted. The user operates the diopter adjusting dial 17A such that an image displayed on the finder 17 is easy to see. This enables an image appropriate to the eyesight of the user to be displayed on the finder 17.

As shown in FIGS. 2 and 3, a custom button 18 is disposed on the back surface of the imaging apparatus 10 on the lower right side of the finder 17 toward the subject, and a rear dial 19 is disposed on the right side of the custom button 18 toward the subject. The custom button 18 is a button to which a user can assign a desired function, like the custom button 13. The rear dial 19 is operated when an aperture value is adjusted, for example.

As shown in FIG. 2, a recording button 20 is disposed on the lower right side of the rear dial 19 toward the subject on the back surface of the imaging apparatus 10. The recording button 20 is pressed when a moving image is captured.

Further, as shown in FIG. 2, an AEL button 21 is disposed on the lower side of the custom button 18 on the back surface of the imaging apparatus 10, and an Fn button 22 is disposed on the lower side of the AEL button 21. The AEL button 21 is pressed when the exposure of the entire screen is fixed, for example. The Fn button 22 is pressed when a setting screen on which functions on various types of imaging are set is displayed.

As shown in FIG. 2, a cross key 23 is disposed below the Fn button 22 on the back surface of the imaging apparatus 10. The cross key 23 is constituted by an upper button 23A, a lower button 23B, a left button 23C, a right button 23D, and a center button 23E. The buttons 23A to 23D of the cross key 23 are each pressed when a cursor or the like within a menu screen or setting screen displayed on a liquid crystal monitor 26 is moved right and left and up and down.

The center button 23E is pressed when an instruction of a decision is given on a menu screen or setting screen displayed on the liquid crystal monitor 26, for example. Further, the center button 23E is pressed when a pupil is selected as a type of a subject serving as a focusing target in each imaging in a state where a menu screen or setting screen is not displayed on the liquid crystal monitor 26. In other words, the center button 23E in a state where a menu screen or setting screen is not displayed on the liquid crystal monitor 26 functions as a selection unit that selects a pupil as a type of a subject serving as a focusing target in each imaging.

As shown in FIG. 2, a reproduction button 24 is disposed on the lower left side of the cross key 23 toward the subject on the back surface of the imaging apparatus 10, and a delete button 25 is disposed on the lower right side thereof. The reproduction button 24 is pressed when a captured image is reproduced. The delete button 25 is pressed when a captured image displayed on the liquid crystal monitor 26 is deleted.

As shown in FIG. 2, the liquid crystal monitor 26 is disposed on the left side toward the subject on the back surface of the imaging apparatus 10. A menu screen, a setting screen, a captured image, and the like are displayed on the liquid crystal monitor 26.

(Hardware Configuration Example of Imaging Apparatus)

Figure 4:
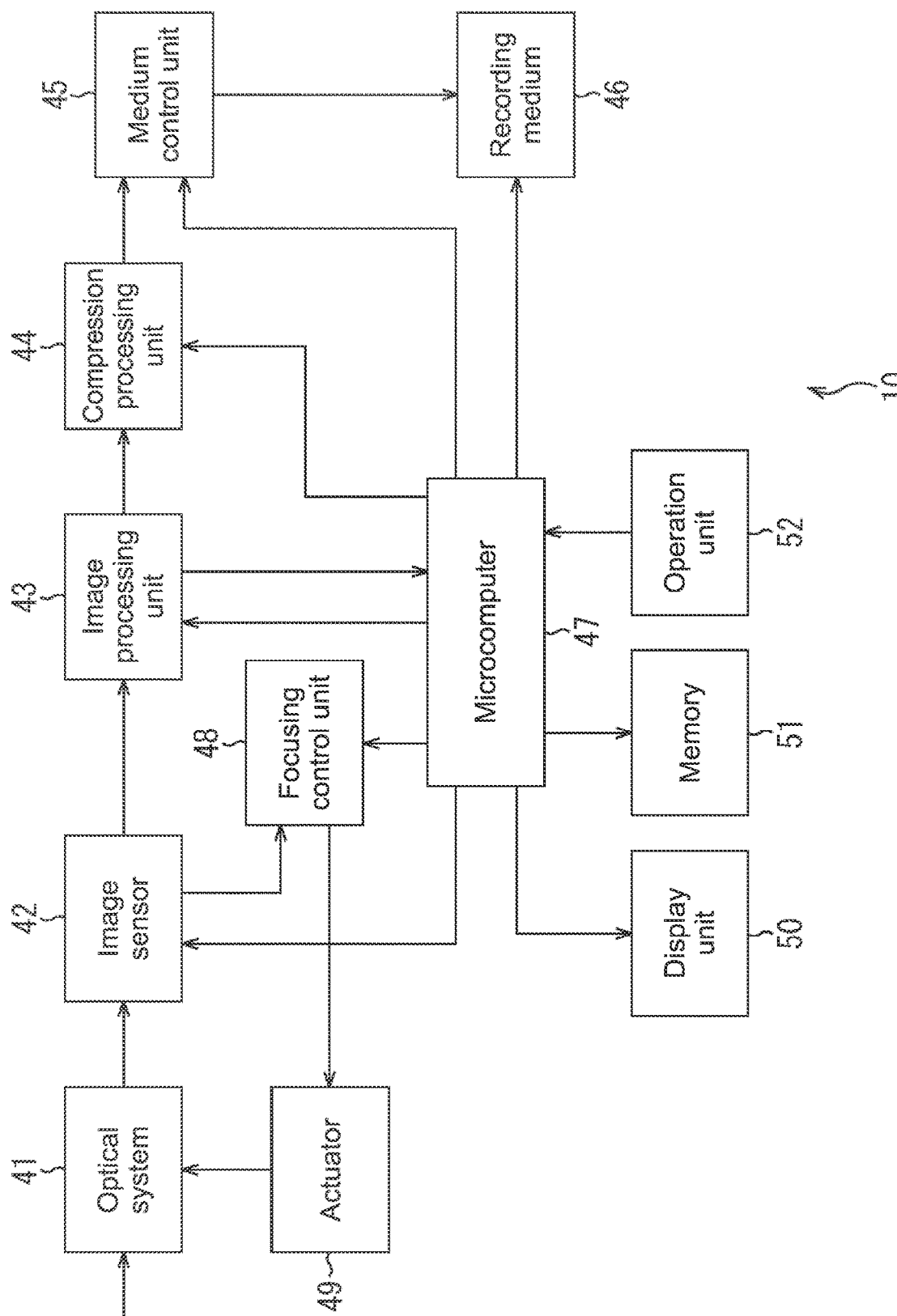
FIG. 4 is a block diagram showing a hardware configuration example of the imaging apparatus of FIG. 1.

FIG. 4 is a block diagram showing a hardware configuration example of the imaging apparatus 10.

The imaging apparatus 10 of FIG. 1 includes an optical system 41, an image sensor 42, an image processing unit 43, a compression processing unit 44, a medium control unit 45, a recording medium 46, a focusing control unit 48, and a microcomputer 47. Further, the imaging apparatus 10 includes the focusing control unit 48, an actuator 49, a display unit 50, a memory 51, and an operation unit 52.

When the center button 23E is pressed in a state where a menu screen or setting screen is not displayed on the liquid crystal monitor 26, the imaging apparatus 10 brings a pupil within an image into focus.

Specifically, the optical system 41 and the image sensor 42 function as an acquisition unit and acquire an image. More specifically, the optical system 41 is constituted by the lens 10A, a diaphragm not shown in the figure, and the like. The optical system 41 collects light from the subject to the image sensor 42. The optical system 41 is driven by the actuator 49.

The image sensor 42 performs photoelectric conversion on the light collected by the lens 10A on a pixel-by-pixel basis and acquires an electrical signal as an analog signal of each pixel of the image. Further, the image sensor 42 acquires phase difference information on the basis of the light collected by the optical system 41 in each detection using one or more pixels. The phase difference information represents a displacement amount of the image from an in-focus surface. The image sensor 42 supplies the electrical signal of each pixel to the image processing unit 43 and supplies the phase difference information to the focusing control unit 48.

The image processing unit 43 performs image processing such as A/D conversion on the electrical signal of each pixel of the image supplied from the image sensor 42. The image processing unit 43 supplies image data, which is resultant digital data of each pixel of the image, to the compression processing unit 44 and the microcomputer 47.

The compression processing unit 44 compresses the image data supplied from the image processing unit 43 as necessary. The compression processing unit 44 supplies the compressed image data to the medium control unit 45.

The medium control unit 45 controls the recording medium 46 to record the compressed image data supplied from the compression processing unit 44 on the recording medium 46. In such a manner, the processing in which an image is acquired by the image sensor 42 and then compressed and the compressed image data is recorded is called imaging. The recording medium 46 records the compressed image data under the control of the medium control unit 45.

The microcomputer 47 controls the units of the imaging apparatus 10. For example, the microcomputer 47 sets a face detection mode on the basis of an operation signal representing an operation from a user and being supplied from the operation unit 52, and supplies the face detection mode to the memory 51 to be stored. The microcomputer 47 causes the liquid crystal monitor 26 of the display unit 50 to display a menu screen or setting screen on the basis of the operation signal or causing the display unit 50 to display an image based on the image data from the image processing unit 43.

Further, the microcomputer 47 functions as an in-focus area control unit that controls the in-focus area. Specifically, the microcomputer 47 detects a face area from the image data supplied from the image processing unit 43. Further, the microcomputer 47 detects a pupil area from the image data on the basis of the face area and an operation signal representing a press of the center button 23E and being supplied from the operation unit 52, when a menu screen or setting screen is not displayed on the liquid crystal monitor 26. The microcomputer 47 sets the face area, the pupil area, or a predetermined area as an in-focus area on the basis of the face detection mode stored in the memory 51 and the operation signal, and supplies the in-focus area to the focusing control unit 48.

The focusing control unit 48 controls the actuator 49 to bring the in-focus area into focus on the basis of the in-focus area supplied from the microcomputer 47 and the phase difference information supplied from the image sensor 42.

The actuator 49 is controlled by the focusing control unit 48 and the like. The actuator 49 drives the optical system 41 and controls a focus position, an aperture value, and a zoom magnification.

The display unit 50 is constituted by the finder 17 and the liquid crystal monitor 26 shown in FIG. 2. The display unit 50 displays a captured image on the basis of the image data of the captured image (compressed and recorded image) under the control of the microcomputer 47. Further, the display unit 50 displays an image based on image data of an image that is not a captured image (that is an image not compressed and recorded), as a live-view image, under the control of the microcomputer 47. The liquid crystal monitor 26 of the display unit 50 displays a menu screen or setting screen under the control of the microcomputer 47.

The memory 51 is a work area of the microcomputer 47. The memory 51 stores an interim result or a final result of the processing by the microcomputer 47. For example, the memory 51 stores the face detection mode supplied from the microcomputer 47.

The operation unit 52 supplies an operation signal to the microcomputer 47, the operation signal representing operations of the release button 11, the power button 11A, the mode dial 12, the custom button 13, the front dial 14, the menu button 16, the diopter adjusting dial 17A, and the custom button 18. Further, the operation unit 52 supplies an operation signal to the microcomputer 47, the operation signal representing operations of the rear dial 19, the recording button 20, the AEL button 21, the Fn button 22, the cross key 23, the reproduction button 24, and the delete button 25.

(Configuration Example of In-focus Area Control Unit)

Figure 5:
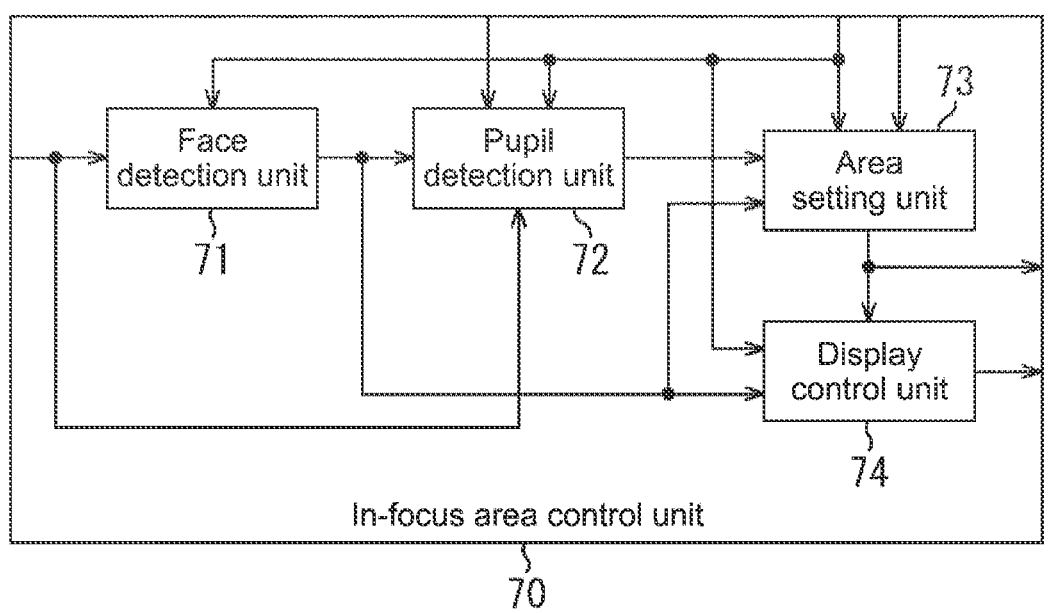
FIG. 5 is a block diagram showing a configuration example of an in-focus area control unit of the first embodiment of the imaging apparatus.

FIG. 5 is a block diagram showing a configuration example of the in-focus area control unit achieved by the microcomputer 47 of FIG. 4.

An in-focus area control unit 70 of FIG. 5 is constituted by a face detection unit 71, a pupil detection unit 72, an area setting unit 73, and a display control unit 74.

The face detection unit 71 of the in-focus area control unit 70 reads the face detection mode from the memory 51. The face detection unit 71 detects a face area from the image data supplied from the image processing unit 43, on the basis of the face detection mode. The face detection unit 71 supplies the face area to the pupil detection unit 72, the area setting unit 73, and the display control unit 74.

The pupil detection unit 72 reads the face detection mode from the memory 51. The pupil detection unit 72 determines whether an operation signal representing a press of the center button 23E is supplied from the operation unit 52 or not in a state where a menu screen or setting screen is not displayed on the liquid crystal monitor 26. The pupil detection unit 72 detects a pupil area from the image data on the basis of a determination result, the face detection mode, and the face area supplied from the face detection unit 71. The pupil detection unit 72 supplies the pupil area to the area setting unit 73.

The area setting unit 73 reads the face detection mode from the memory 51. The area setting unit 73 sets the face area, the pupil area, or a predetermined area as an in-focus area in each imaging on the basis of the face detection mode and the operation signal representing a half-press of the release button 11 and being supplied from the operation unit 52. The area setting unit 73 supplies the in-focus area to the display control unit 74 and the focusing control unit 48 of FIG. 4.

The display control unit 74 reads the face detection mode from the memory 51. The display control unit 74 superimposes a face frame, which represents the face area supplied from the face detection unit 71, on a live-view image being displayed, on the basis of the face detection mode, for display on the display unit 50. Further, the display control unit 74 superimposes a frame, which represents the in-focus area supplied from the area setting unit 73, on a live-view image being displayed, for display on the display unit 50.

(Example of Setting Screen of Face Detection Function)

Figure 6:
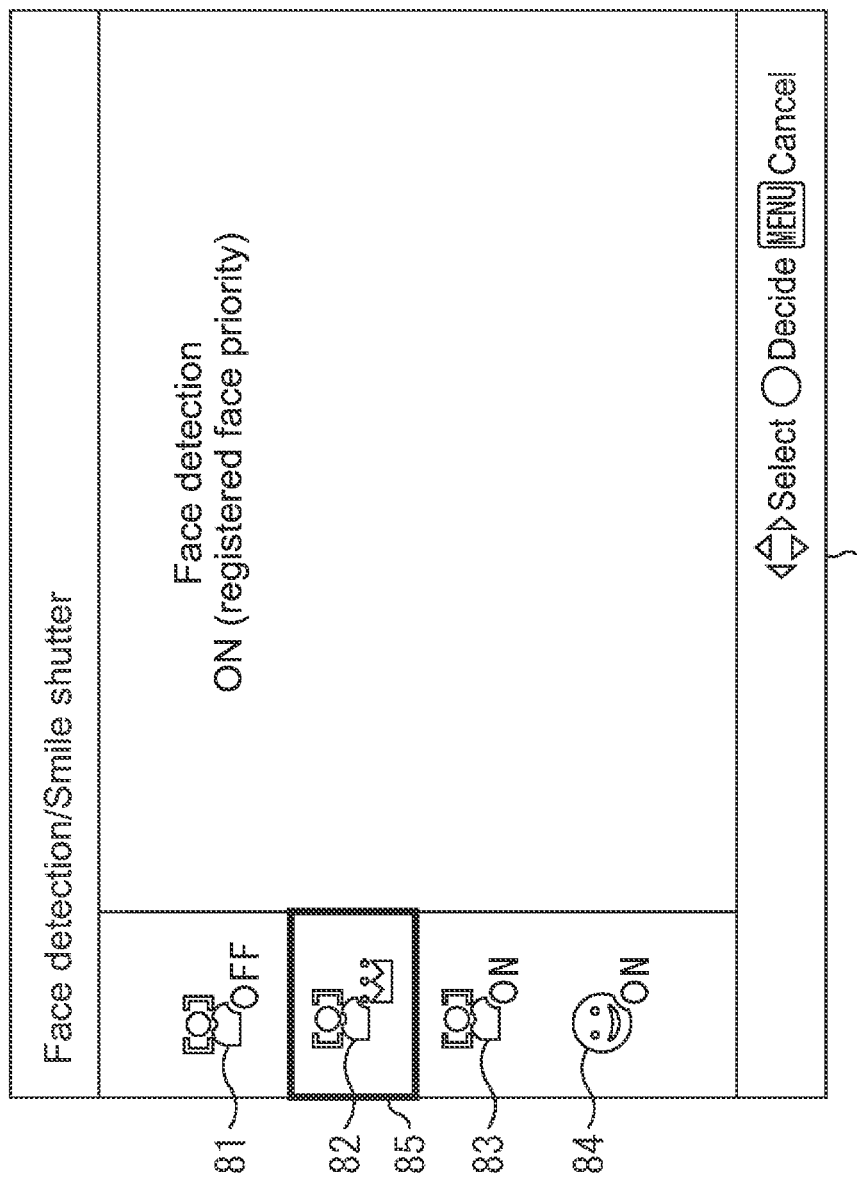
FIG. 6 is a diagram showing an example of a setting screen of a face detection function.

FIG. 6 is a diagram showing an example of a setting screen of the face detection function displayed on the liquid crystal monitor 26.

The setting screen of the face detection function is displayed when the user presses the Fn button 22.

As shown in FIG. 6, a setting screen 80 of the face detection function includes a face detection OFF mode button 81. The face detection OFF mode button 81 is operated when a face detection OFF mode for bringing the face area out of focus is selected as the face detection mode.

The setting screen 80 includes a registered face mode button 82. The registered face mode button 82 is operated when a registered face detection mode for preferentially bringing an area of a registered face image, which is a previously registered face image, into focus more than other face areas is selected as the face detection mode.

It should be noted that the image data of the registered face image is stored in the memory 51, for example. In the case where the face detection mode is the registered face detection mode, the face detection unit 71 performs matching between the image data supplied from the image processing unit 43 and the image data of the registered face image, to detect an area of the registered face image as a face area. In the case where an area of the registered face image is not detected, the face detection unit 71 detects an area of a face image other than the registered face image as a face area.

The setting screen 80 includes a face detection ON mode button 83. The face detection ON mode button 83 is operated when a face detection ON mode for bringing the face area into focus is selected as the face detection mode. Further, the setting screen 80 includes a smile shutter mode button 84. The smile shutter mode button 84 is operated when a smile shutter mode for capturing an image in which a smile is detected is selected as the face detection mode.

A cursor 85 is superimposed on any of the face detection OFF mode button 81, the registered face mode button 82, the face detection ON mode button 83, and the smile shutter mode button 84 within the setting screen 80, and displayed.

The user presses the buttons 23A to 23D of the cross key 23 and thus moves the cursor 85. When the cursor 85 is then superimposed on the face detection OFF mode button 81, the registered face mode button 82, the face detection ON mode button 83, or the smile shutter mode button 84 that corresponds to a desired face detection mode, the user presses the center button 23E.

This enables the setting of the face detection mode that corresponds to the face detection OFF mode button 81, the registered face mode button 82, the face detection ON mode button 83, or the smile shutter mode button 84 on which the cursor 85 is superimposed. In the example of FIG. 6, the cursor 85 is superimposed on the registered face mode button 82. When the center button 23E is pressed at that time, the registered face detection mode is set as the face detection mode.

(Description on Relationship between Face Detection Mode and Face Frame Display)

FIG. 7 is a diagram for describing a relationship between a face detection mode and face frame display for an image before an instruction of focusing is given by a half-press of the release button 11 or a press of the center button 23E.

As shown in FIG. 7, even in the case where the face detection mode is any of the face detection OFF mode, the registered face detection mode, the face detection mode, and the smile shutter mode, the face detection unit 71 performs face detection.

In the case where the face detection mode is the face detection OFF mode, however, the face frame is not superimposed on a live-view image being displayed, before an instruction of focusing is given. In the case where the face detection mode is other than the face detection OFF mode, the face frame is superimposed on a live-view image being displayed, before an instruction of focusing is given.

(Description on Relationship between Face Detection Mode and In-focus Area)

FIG. 8 is a diagram for describing a relationship between the face detection mode and the in-focus area.

As shown in FIG. 8, in the case where the face detection mode is other than the smile shutter mode, when the center button 23E of the cross key 23 is pressed in a state where a menu screen or setting screen is not displayed on the liquid crystal monitor 26, the in-focus area is set for the pupil area. In the case where the face detection mode is the registered face detection mode and an area of the registered face image is detected, the pupil area is an area of a pupil in the registered face image.

On the other hand, in the case where the face detection mode is the smile shutter mode, when the center button 23E is pressed in a state where a menu screen or setting screen is not displayed on the liquid crystal monitor 26, the in-focus area is set for the face area.

Further, when the release button 11 is half pressed in the case where the face detection mode is the face detection OFF mode, the in-focus area is set for the predetermined area. On the other hand, when the release button 11 is half pressed in the case where the face detection mode is other than the face detection OFF mode, the in-focus area is set for the face area. In the case where the face detection mode is the registered face detection mode and an area of the registered face image is detected, the face area is the area of the registered face image.

(Description on Display in Face Detection OFF Mode)

Figure 9:
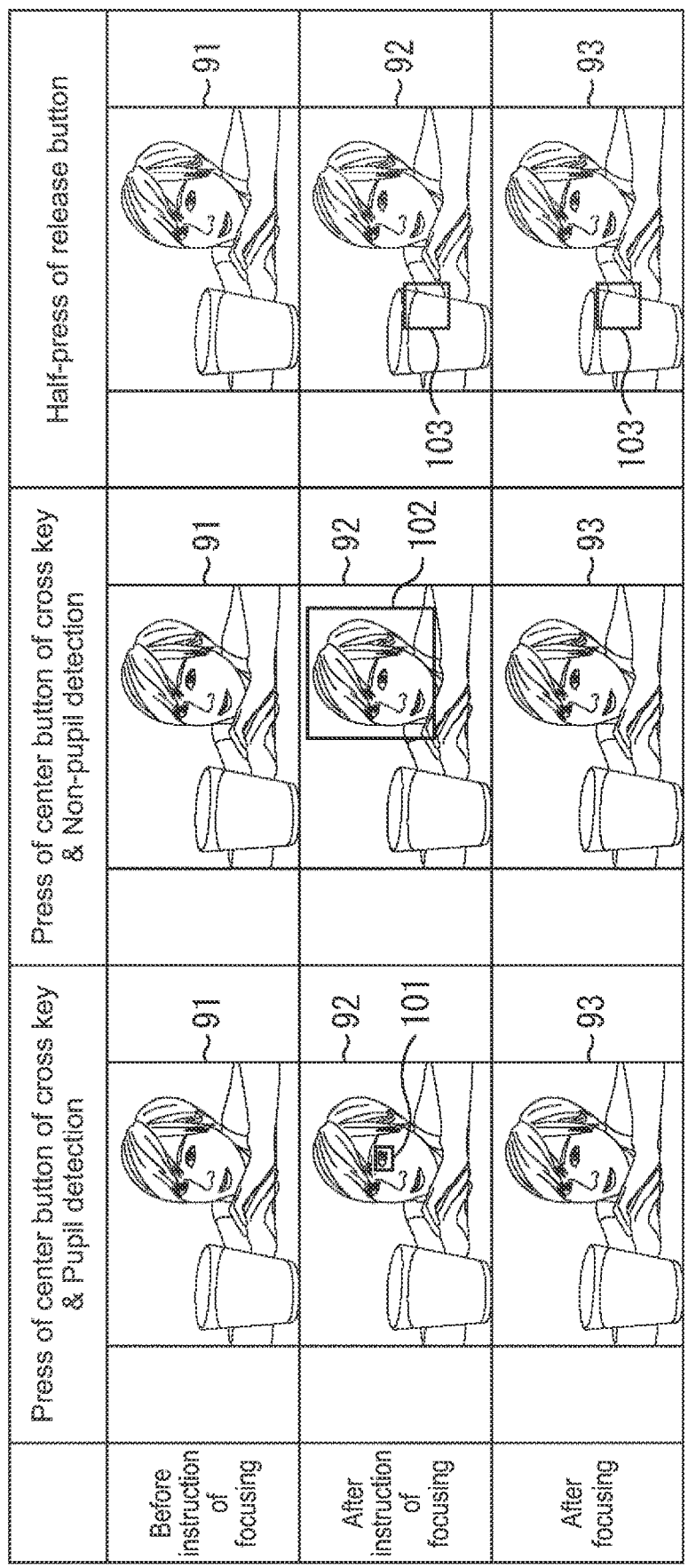
FIG. 9 is a diagram for describing display in the face detection mode.

FIG. 9 is a diagram for describing display on the display unit 50 in the face detection mode.

As shown in FIG. 9, in the face detection mode, in the case where an instruction of focusing is given by pressing the center button 23E of the cross key 23 in a state where a menu screen or setting screen is not displayed on the liquid crystal monitor 26, nothing is superimposed on a live-view image 91 being displayed, before the instruction of focusing is given.

After the instruction of focusing is given, a pupil area is detected by the pupil detection unit 72. In the case where a pupil area is detected, the in-focus area is set for the pupil area by the area setting unit 73, and a pupil frame 101 representing a pupil area as the in-focus area is superimposed on a live-view image 92 being displayed. The pupil area represented by the pupil frame 101 is then brought into focus. On the other hand, in the case where the pupil area is not detected, the in-focus area is set for the face area by the area setting unit 73, and a face frame 102 representing the face area as the in-focus area is superimposed on the live-view image 92 being displayed. The face area represented by the face frame 102 is then brought into focus. After focusing is achieved, nothing is superimposed again on a live-view image 93 being displayed.

Further, in the face detection OFF mode, in the case where an instruction of focusing is given by half pressing the release button 11, nothing is superimposed on the live-view image 91 being displayed, before the instruction of focusing is given. After the instruction of focusing is given, the in-focus area is set for the predetermined area by the area setting unit 73, and a predetermined frame 103 representing a predetermined area as the in-focus area is superimposed on the live-view image 92 being displayed. The predetermined area represented by the predetermined frame 103 is then brought into focus. It should be noted that in the example of FIG. 9, the predetermined area is an area of a subject whose position in the depth direction is closest to the imaging apparatus 10. After focusing is achieved, the predetermined frame 103 remains superimposed on the live-view image 93 being displayed.

(Description on Display in Face Detection ON Mode)

Figure 10:
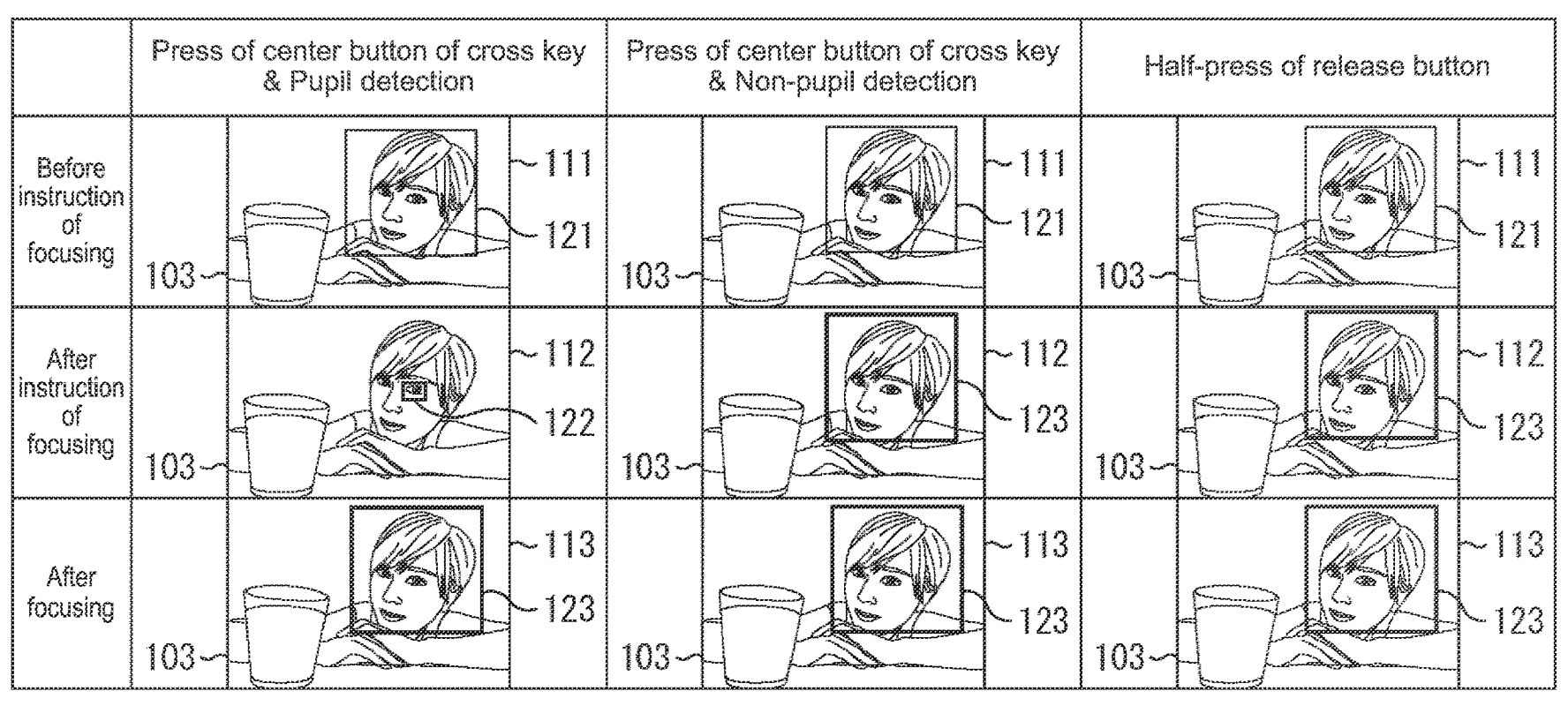

FIG. 10 is a diagram for describing display on the display unit 50 in the face detection ON mode.

As shown in FIG. 10, in the face detection ON mode, in the case where an instruction of focusing is given by pressing the center button 23E of the cross key 23 in a state where a menu screen or setting screen is not displayed on the liquid crystal monitor 26, a temporary face frame 121 representing a face area as a candidate of the in-focus area is superimposed on a live-view image 111 being displayed, before an instruction of focusing is given.

After the instruction of focusing is given, a pupil area is detected by the pupil detection unit 72. In the case where a pupil area is detected, the in-focus area is set for the pupil area by the area setting unit 73, and a pupil frame 122 representing a pupil area as the in-focus area is superimposed on a live-view image 112 being displayed. The pupil area represented by the pupil frame 122 is then brought into focus. On the other hand, in the case where the pupil area is not detected, the in-focus area is set for the face area by the area setting unit 73, and a face frame 123 representing the face area as the in-focus area is superimposed on the live-view image 112 being displayed. The face area represented by the face frame 123 is then brought into focus. After focusing is achieved, the face frame 123 is superimposed on a live-view image 113 being displayed.

Further, in the face detection ON mode, in the case where an instruction of focusing is given by half pressing the release button 11, the temporary face frame 121 is superimposed on the live-view image 111 being displayed, before the instruction of focusing is given. After the instruction of focusing is given, the in-focus area is set for the face area by the area setting unit 73, and the face frame 123 is superimposed on the live-view image 112 being displayed. After focusing is achieved, the face frame 123 remains superimposed on the live-view image 113 being displayed.

In order to easily recognize that the temporary face frame 121 represents not the in-focus area but a candidate of the in-focus area, the temporary face frame 121, the pupil frame 122, and the face frame 123 may be changed in color, thickness, type of line, and the like.

(Description on Processing of Imaging Apparatus)

Figure 11:
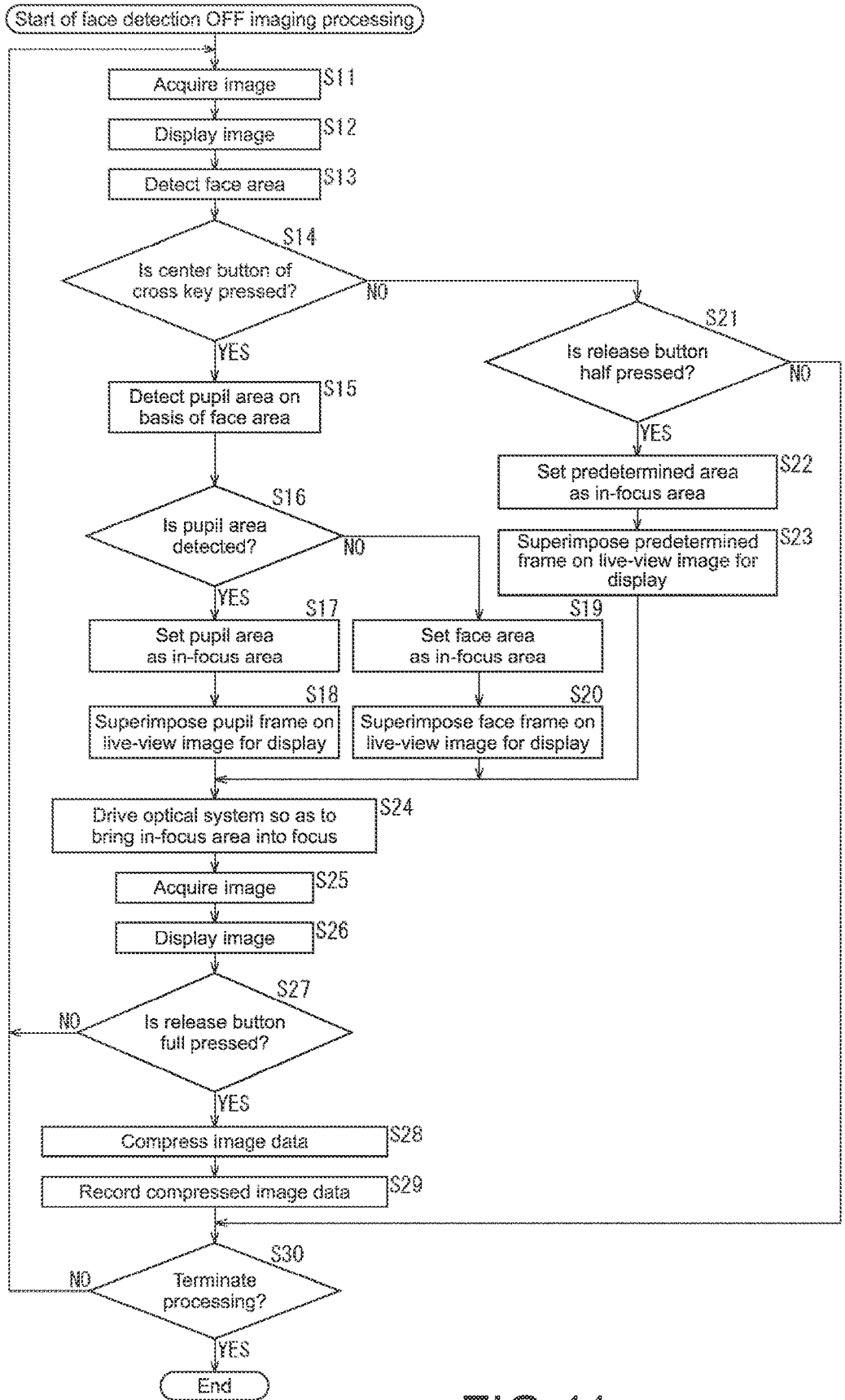
FIG. 11 is a flowchart for describing face detection OFF imaging processing according to the first embodiment of the imaging apparatus.

FIG. 11 is a flowchart for describing the face detection OFF imaging processing that is imaging processing of the imaging apparatus 10 in the case where the face detection mode is the face detection OFF mode. This face detection OFF imaging processing is started when the power is turned on by operating the power button 11A, for example.

In Step S11 of FIG. 11, the image sensor 42 acquires an electrical signal of each pixel of the image by performing photoelectric conversion on light from the subject, the light being collected via the optical system 41, on a pixel-by-pixel basis. The image sensor 42 supplies the electrical signal of each pixel of the image to the image processing unit 43, and thus the image data is supplied to the compression processing unit 44 and the microcomputer 47.

In Step S12, the microcomputer 47 displays an image based on the image data supplied from the image processing unit 43, as a live-view image, on the display unit 50.

In Step S13, the face detection unit 71 of the microcomputer 47 detects a face area from the image data supplied from the image processing unit 43. The face detection unit 71 supplies the face area to the pupil detection unit 72, the area setting unit 73, and the display control unit 74.

In Step S14, the pupil detection unit 72 determines whether the center button 23E of the cross key 23 is pressed or not in a state where a menu screen or setting screen is not displayed on the liquid crystal monitor 26, on the basis of an operation signal from the operation unit 52. In Step S14, when it is determined that the center button 23E is pressed, the processing proceeds to Step S15.

In Step S15, the pupil detection unit 72 detects a pupil area from the image data supplied from the image processing unit 43, on the basis of the face area supplied from the face detection unit 71.

In Step S16, the pupil detection unit 72 determines whether a pupil area is detected or not by the processing of Step S15. When it is determined in Step S16 that a pupil area is detected, the pupil detection unit 72 supplies the detected pupil area to the area setting unit 73. In Step S17, the area setting unit 73 then sets the pupil area, which is supplied from the pupil detection unit 72, as the in-focus area, and supplies the pupil area to the display control unit 74 and the focusing control unit 48 of FIG. 4.

In Step S18, the display control unit 74 superimposes a pupil frame on a live-view image being displayed, on the basis of the pupil area supplied from the area setting unit 73, for display on the display unit 50. The processing then proceeds to Step S24.

On the other hand, when it is determined in Step S16 that a pupil area is not detected, in Step S19, the area setting unit 73 sets the face area, which is supplied from the face detection unit 71, as the in-focus area, and supplies the face area to the display control unit 74 and the focusing control unit 48.

In Step S20, the display control unit 74 superimposes a face frame on a live-view image being displayed, on the basis of the face area supplied from the area setting unit 73, for display on the display unit 50. The processing then proceeds to Step S24.

Further, when it is determined in Step S14 that the center button 23E is not pressed, the processing proceeds to Step S21. In Step S21, the area setting unit 73 determines whether the release button 11 is half pressed or not, on the basis of the operation signal supplied from the operation unit 52.

When it is determined in Step S21 that the release button 11 is half pressed, in Step S22, the area setting unit 73 sets a predetermined area as the in-focus area and supplies the predetermined area to the display control unit 74 and the focusing control unit 48.

In Step S23, the display control unit 74 superimposes a predetermined frame on a live-view image being displayed, on the basis of the predetermined area supplied from the area setting unit 73, for display on the display unit 50. The processing then proceeds to Step S24.

In Step S24, the image sensor 42 acquires phase difference information, and the focusing control unit 48 controls the actuator 49 to bring the in-focus area into focus on the basis of the in-focus area from the area setting unit 73 and the phase difference information from the image sensor 42, to drive the optical system 41.

In Step S25, the image sensor 42 acquires an electrical signal of each pixel of the image by performing photoelectric conversion on light from the subject, the light being collected via the optical system 41, on a pixel-by-pixel basis. The image sensor 42 supplies the electrical signal of each pixel of the image to the image processing unit 43, and thus the image data is supplied to the compression processing unit 44 and the microcomputer 47.

In Step S26, the microcomputer 47 displays an image based on the image data supplied from the image processing unit 43, as a live-view image, on the display unit 50. Further, the display control unit 74 superimposes a frame representing the in-focus area on the live-view image, for display on the display unit 50.

In Step S27, the microcomputer 47 determines whether the release button 11 is full pressed or not, on the basis of the operation signal from the operation unit 52. In Step S27, when it is determined that the release button 11 is full pressed, the processing proceeds to Step S28.

In Step S28, the compression processing unit 44 compresses the image data supplied from the image processing unit 43. The compression processing unit 44 supplies the compressed image data to the medium control unit 45.

In Step S29, the medium control unit 45 controls the recording medium 46 to record the compressed image data, which is supplied from the compression processing unit 44, on the recording medium 46, and proceeds the processing to Step S30.

Further, in Step S21, when it is determined that the release button 11 is not half pressed, the processing proceeds to Step S30.

In Step S30, the imaging apparatus 10 determines whether to terminate the processing or not, for example, whether the power button 11A is operated or not.

In Step S27, when it is determined that the release button 11 is not full pressed, or in Step S30, when it is determined that the processing is not terminated, and when the in-focus area is other than the predetermined area, the area setting unit 73 sets the in-focus area for the face area. This enables the optical system 41 to be driven so as to bring the face area into focus.

On the other hand, when the in-focus area is the predetermined area, the area setting unit 73 leaves the in-focus area as the predetermined area. This enables the optical system 41 to be driven so as to bring the predetermined area into focus. The processing is then returned to Step S11, and the subsequent processing is repeated. At that time, in the case where the in-focus area is the predetermined area, a predetermined frame is superimposed on a live-view image to be displayed, in the processing of Step S12.

On the other hand, when it is determined in Step S30 that the processing is terminated, the processing is terminated.

Figure 12:
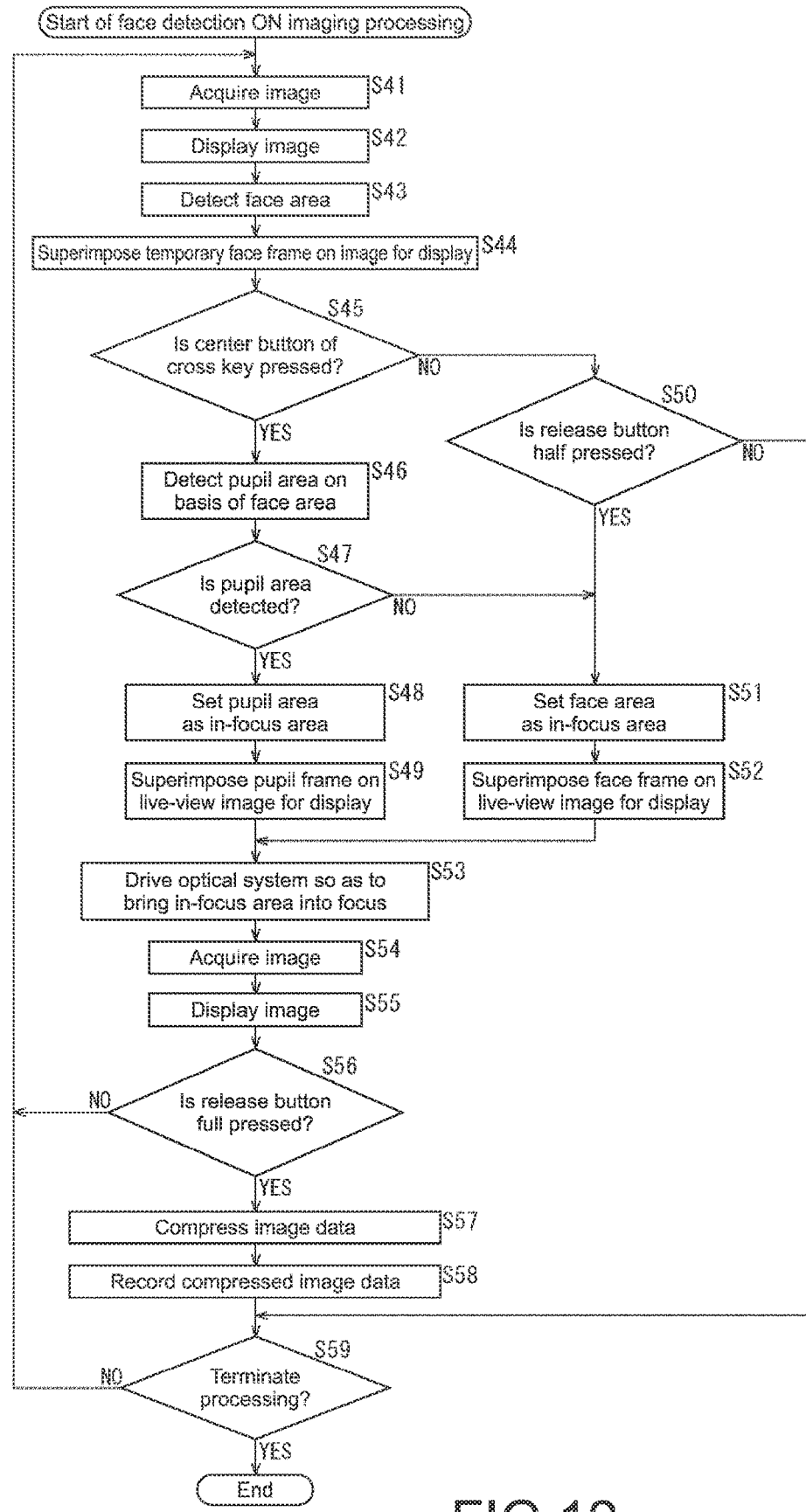
FIG. 12 is a flowchart for describing face detection ON imaging processing according to the first embodiment of the imaging apparatus.

FIG. 12 is a flowchart for describing the face detection ON imaging processing that is imaging processing of the imaging apparatus 10 in the case where the face detection mode is the face detection ON mode. This face detection ON imaging processing is started when the power is turned on by operating the power button 11A, for example.

Processing from Steps S41 to S43 of FIG. 12 is similar to the processing from Steps S11 to S13 of FIG. 11, and thus description thereof will be omitted.

In Step S44, the display control unit 74 superimposes a temporary face frame of the face area supplied from the face detection unit 71 on a live-view image being displayed, for display on the display unit 50.

Processing from Steps S45 to S49 is similar to the processing from Steps S14 to S18 of FIG. 11, and thus description thereof will be omitted.

In Step S45, when it is determined that the center button 23E of the cross key 23 is not pressed, the processing proceeds to Step S50. In Step S50, the area setting unit 73 determines whether the release button 11 is half pressed or not, on the basis of the operation signal supplied from the operation unit 52.

In Step S50, when it is determined that the release button 11 is half pressed, the processing proceeds to Step S51. Further, in Step S47, when it is determined that a pupil area is not detected, the processing proceeds to Step S51.

Processing from Steps S51 to S59 is similar to the processing of Steps S19, S20, and S24 to S30 of FIG. 11, and thus description thereof will be omitted. It should be noted that in the second and subsequent processing of Step S44, not a temporary face frame but a face frame is displayed.

It should be noted that the imaging processing of the imaging apparatus 10 in the case where the face detection mode is the registered face detection mode is similar to the face detection ON imaging processing except that matching between the acquired image data and the image data of the registered face image is performed in the processing of Step S43, though not shown in the figure. In the case where an area of the registered face image is detected by the matching, the area of the registered face image is set as the face area, and in the case where the area of the registered face image is not detected, an area of a face image other than the registered face image is set as the face area.

Further, the imaging processing of the imaging apparatus 10 in the case where the face detection mode is the smile shutter mode is similar to the face detection ON imaging processing except that the processing of Steps S45 to S49 is not performed.

As described above, since the center button 23E functions as a selection unit that selects a pupil as a type of a subject serving as a focusing target in each imaging, the imaging apparatus 10 sets the in-focus area for the face area or the predetermined area until the center button 23E is pressed after imaging is performed.

Further, in the case where a pupil is selected as a type of a subject serving as a focusing target in each imaging with use of the center button 23E, the imaging apparatus 10 sets the pupil area as the in-focus area. Therefore, a pupil as a type of a subject serving as a focusing target can be easily set in each imaging. Further, a pupil as a type of a subject serving as a focusing target can be quickly set in each imaging.

Second Embodiment (Configuration Example of Second Embodiment of Imaging Apparatus)

Figure 13:
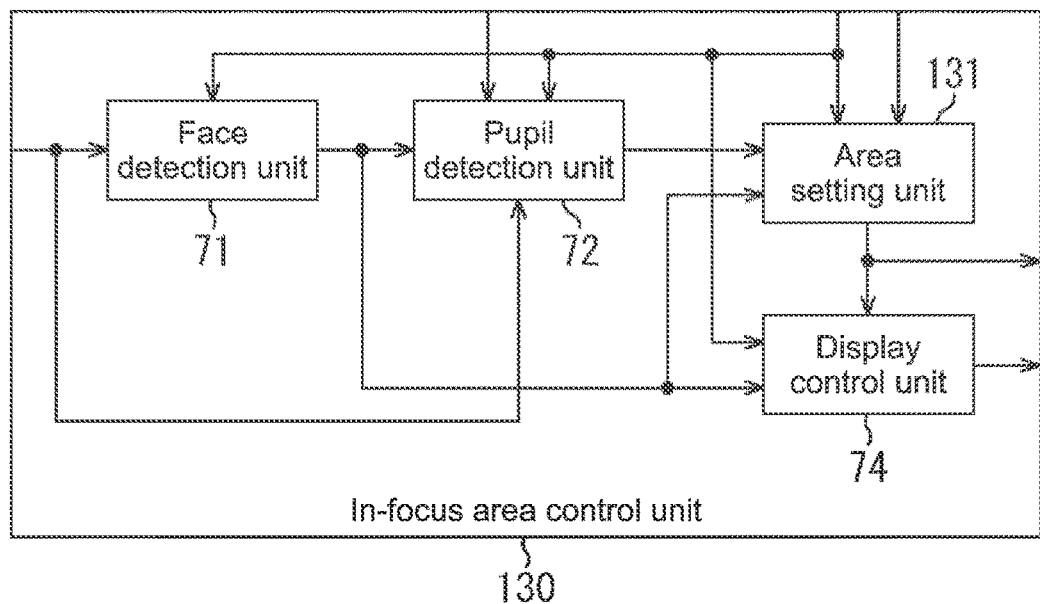
FIG. 13 is a block diagram showing a configuration example of an in-focus area control unit of a second embodiment of an imaging apparatus to which the present disclosure is applied.

FIG. 13 is a block diagram showing a configuration example of an in-focus area control unit achieved by a microcomputer 47 of a second embodiment of the imaging apparatus 10 to which the present disclosure is applied.

The second embodiment of the imaging apparatus 10 is configured to be basically similar to the first embodiment except for the in-focus area control unit. Note that a half-press of the release button 11 functions as an instruction unit that gives an instruction of focusing. In other words, in the second embodiment of the imaging apparatus 10, only a press of the center button 23E of the cross key 23 does not perform focusing. After the center button 23E is pressed and when the release button 11 is half pressed, focusing is performed.

In the configuration shown in FIG. 13, the same configurations as those of FIG. 5 are denoted by the same reference numerals. Overlapping description will be appropriately omitted.

The configuration of an in-focus area control unit 130 of FIG. 13 is different from the configuration of FIG. 5 in that an area setting unit 131 is provided instead of the area setting unit 73.

The area setting unit 131 of the in-focus area control unit 130 reads a face detection mode from the memory 51. In the case where an operation signal representing a half-press of the release button 11 is supplied from the operation unit 52, the area setting unit 131 sets a face area, a pupil area, or a predetermined area as an in-focus area in each imaging on the basis of the face detection mode. The area setting unit 131 supplies the in-focus area to the display control unit 74 and the focusing control unit 48 of FIG. 4.

(Description on Processing of Imaging Apparatus)

Imaging processing corresponding to the face detection mode according to the second embodiment of the imaging apparatus 10 is similar to that in the first embodiment except that when the center button 23E is pressed, determination on whether the release button 11 is half pressed or not is performed before an optical system is driven. When it is determined that the release button 11 is half pressed, the optical system is driven so as to bring the in-focus area into focus, whereas when it is determined that the release button 11 is not half pressed, the optical system is not driven.

As described above, in the second embodiment of the imaging apparatus 10, focusing can be achieved by a half-press of the release button 11 not by an in-focus area. Therefore, an operation by a user who is used to giving an instruction of focusing by half pressing the release button 11 can be made simple.

In contrast to this, in the first embodiment of the imaging apparatus 10, one operation of pressing the center button 23E enables selecting a type of a subject as a focusing target and giving an instruction of focusing. Therefore, an operation by a user can be made simple.

Third Embodiment (Configuration Example of Third Embodiment of Imaging Apparatus)

Figure 14:
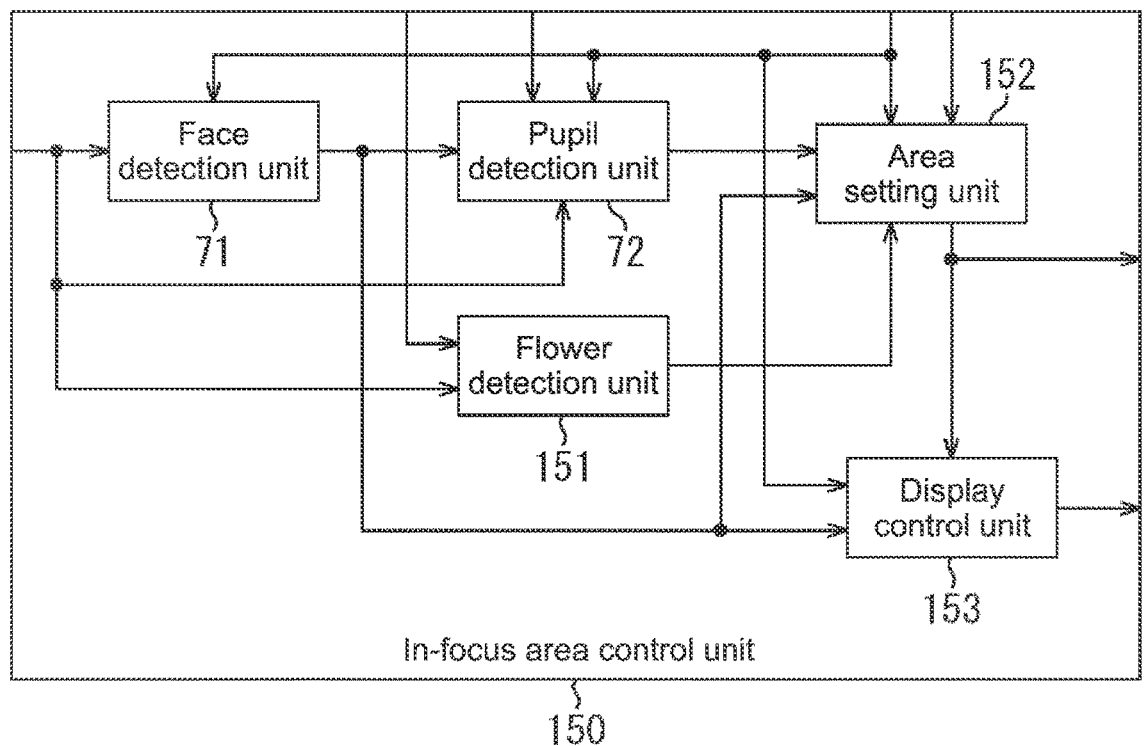
FIG. 14 is a block diagram showing a configuration example of an in-focus area control unit of a third embodiment of an imaging apparatus to which the present disclosure is applied.

FIG. 14 is a block diagram showing a configuration example of an in-focus area control unit achieved by a microcomputer 47 of a third embodiment of the imaging apparatus 10 to which the present disclosure is applied.

The third embodiment of the imaging apparatus 10 is configured to be basically similar to the first embodiment except for the in-focus area control unit.

Note that the upper button 23A of the cross key 23 is pressed also when a flower is selected as a type of a subject as a focusing target in each imaging in a state where a menu screen or setting screen is not displayed on the liquid crystal monitor 26. In other words, in the third embodiment of the imaging apparatus 10, in a state where a menu screen or setting screen is not displayed on the liquid crystal monitor 26, the upper button 23A functions as a selection unit that selects a flower as a type of a subject serving as a focusing target in each imaging.

In the configuration shown in FIG. 14, the same configurations as those of FIG. 5 are denoted by the same reference numerals. Overlapping description will be appropriately omitted.

The configuration of an in-focus area control unit 150 of FIG. 14 is different from the configuration of FIG. 5 in that a flower detection unit 151 is newly provided and that an area setting unit 152 and a display control unit 153 are provided instead of the area setting unit 73 and the display control unit 74.

The flower detection unit 151 of the in-focus area control unit 150 determines whether an operation signal representing a press of the upper button 23A of the cross key 23 is supplied from the operation unit 52 or not, in a state where a menu screen or setting screen is not displayed on the liquid crystal monitor 26. The flower detection unit 151 detects a flower area from the image data supplied from the image processing unit 43 on the basis of a determination result. The flower detection unit 151 supplies the flower area to the area setting unit 152.

The area setting unit 152 reads the face detection mode from the memory 51. The area setting unit 152 sets a face area, a pupil area, a flower area, or a predetermined area as an in-focus area in each imaging on the basis of the face detection mode and the operation signal representing a half-press of the release button 11 and being supplied from the operation unit 52. The area setting unit 152 supplies the in-focus area to the display control unit 153 and the focusing control unit 48 of FIG. 4.

The display control unit 153 reads the face detection mode from the memory 51. The display control unit 153 superimposes a face frame, which represents the face area supplied from the face detection unit 71, on a live-view image being displayed, on the basis of the face detection mode, for display on the display unit 50. Further, the display control unit 153 superimposes a frame, which represents the in-focus area supplied from the area setting unit 152, on a live-view image being displayed, for display on the display unit 50.

(Description on Processing of Imaging Apparatus)

Figure 15:
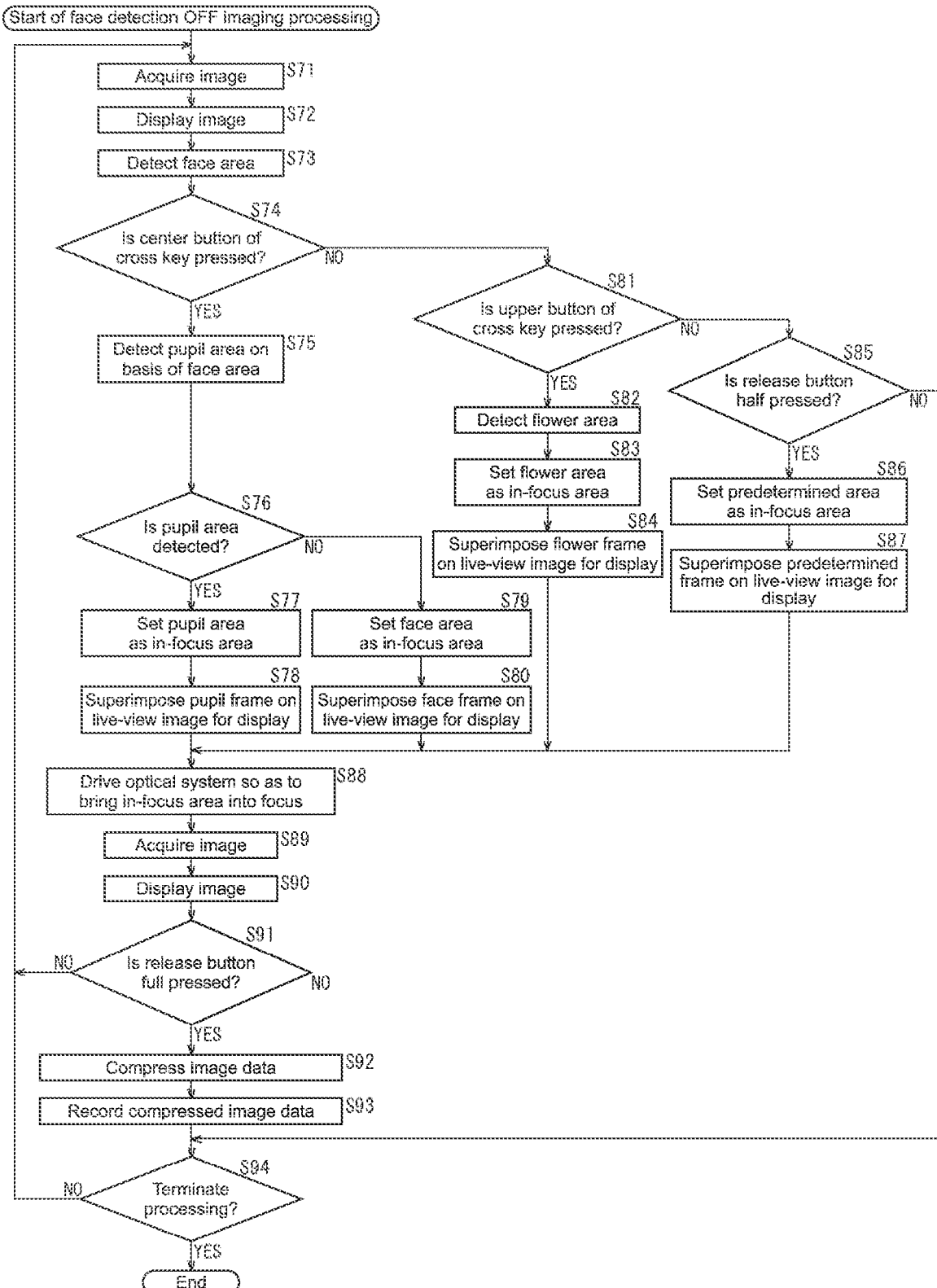
FIG. 15 is a flowchart for describing face detection OFF imaging processing according to the third embodiment of the imaging apparatus.

FIG. 15 is a flowchart for describing face detection OFF imaging processing according to the third embodiment of the imaging apparatus 10. This face detection OFF imaging processing is started when the power is turned on by operating the power button 11A, for example.

Processing from Steps S71 to S80 of FIG. 15 is similar to the processing from Steps S11 to S20 of FIG. 11, and thus description thereof will be omitted.

In Step S74, when it is determined that the center button 23E is not pressed, the processing proceeds to Step S81, In Step S81, the flower detection unit 151 determines whether the upper button 23A of the cross key 23 is pressed or not in a state where a menu screen or setting screen is not displayed on the liquid crystal monitor 26, on the basis of the operation signal supplied from the operation unit 52.

In Step S81, when it is determined that the upper button 23A is pressed, the processing proceeds to Step S82. In Step S82, the flower detection unit 151 detects a flower area from the image data supplied from the image processing unit 43 and supplies the flower area to the area setting unit 152.

In Step S83, the area setting unit 152 sets, as an in-focus area, the flower area supplied from the flower detection unit 151 and supplies the flower area to the display control unit 153 and the focusing control unit 48 of FIG. 4.

In Step S84, the display control unit 153 superimposes a flower frame, which represents the flower area, on a live-view image being displayed, on the basis of the flower area supplied from the area setting unit 152, for display on the display unit 50. The processing then proceeds to Step S88.

Processing from Steps S85 to S94 is similar to the processing from Steps S21 to S30 of FIG. 11, and thus description thereof will be omitted.

Figure 16:
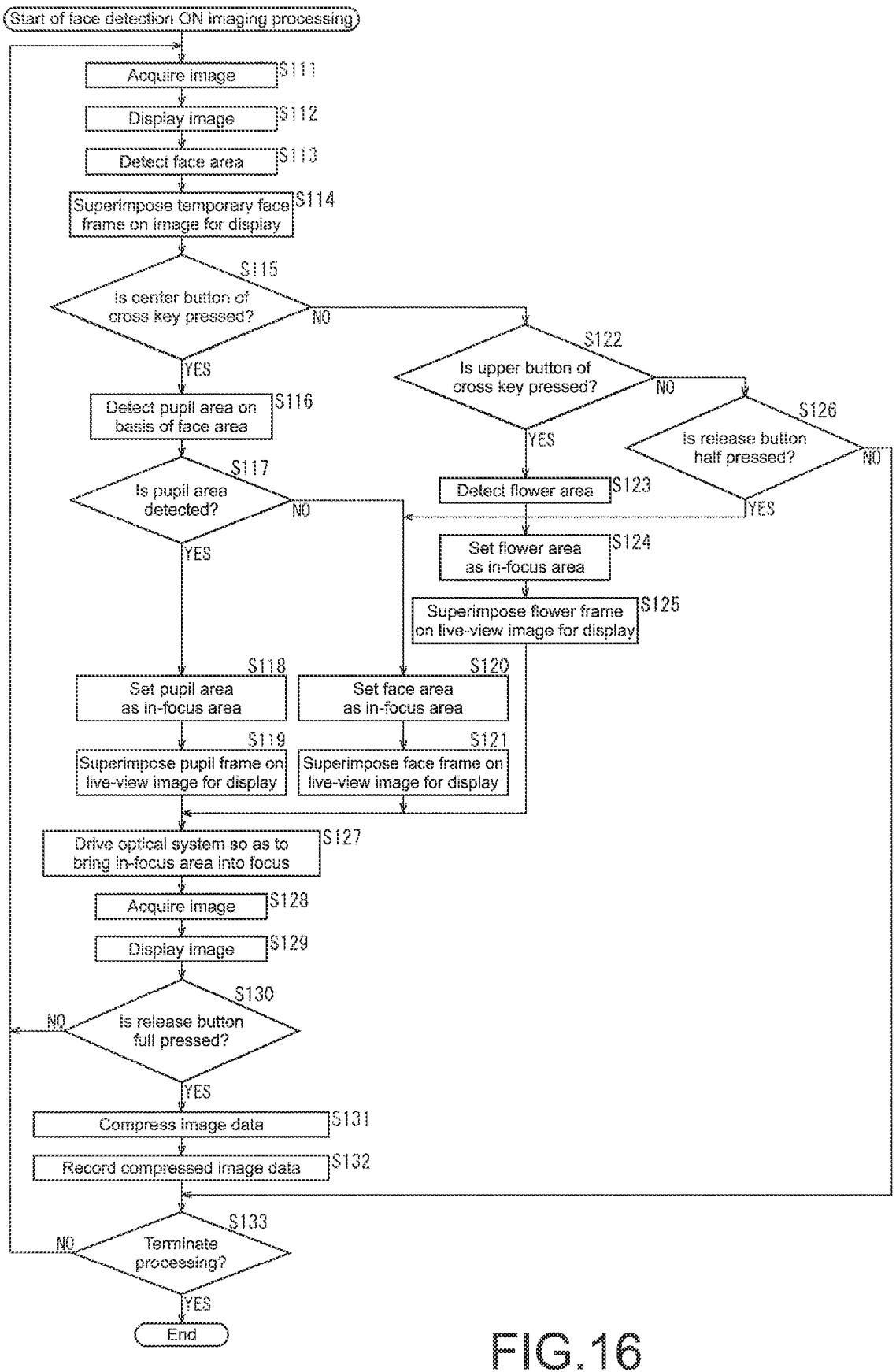
FIG. 16 is a flowchart for describing face detection ON imaging processing according to the third embodiment of the imaging apparatus.

FIG. 16 is a flowchart for describing face detection ON imaging processing according to the third embodiment of the imaging apparatus 10. This face detection ON imaging processing is started when the power is turned on by operating the power button 11A, for example.

Processing from Steps S111 to S121 of FIG. 16 is similar to the processing from Steps S41 to S49, S51, and S52 of FIG. 12, and thus description thereof will be omitted.

Processing from Steps S122 to S126 is similar to the processing from Steps S81 to S85 of FIG. 15, and thus description thereof will be omitted.

In Step S126, when it is determined that the release button 11 is half pressed, the processing proceeds to Step S120. On the other hand, in Step S126, when it is determined that the release button 11 is not half pressed, the processing proceeds to Step S133.

Processing from Steps S127 to S133 is similar to the processing from Steps S24 to S30 of FIG. 11, and thus description thereof will be omitted.

As described above, since the upper button 23A functions as a selection unit that selects a flower as a type of a subject serving as a focusing target in each imaging, the imaging apparatus 10 sets the in-focus area for the face area or the predetermined area until the upper button 23A is pressed after imaging is performed.

Further, in the third embodiment of the imaging apparatus 10, in the case where a pupil is selected as a type of a subject serving as a focusing target in each imaging with use of the center button 23A, a pupil area is set as the in-focus area. Additionally, in the third embodiment of the imaging apparatus 10, in the case where a flower is selected as a type of a subject serving as a focusing target in each imaging with use of the upper button 23A, a flower area is set as the in-focus area. Therefore, a pupil or a flower as a type of a subject serving as a focusing target can be easily set in each imaging. Further, a pupil or a flower as a type of a subject serving as a focusing target can be quickly set in each imaging.

It should be noted that also in the third embodiment of the imaging apparatus 10, as in the second embodiment, focusing may be achieved by not only pressing the upper button 23A and the center button 23E but also half pressing the release button 11.

Fourth Embodiment (Description on Computer to which Present Disclosure is Applied)

The series of processing described above can be executed by hardware or software. In the case where the series of processing is executed by software, a program constituting the software is installed in a computer. Here, the computer includes a computer incorporated in dedicated hardware, a general-purpose personal computer that can execute various functions by installing various programs therein, and the like.

Figure 17:
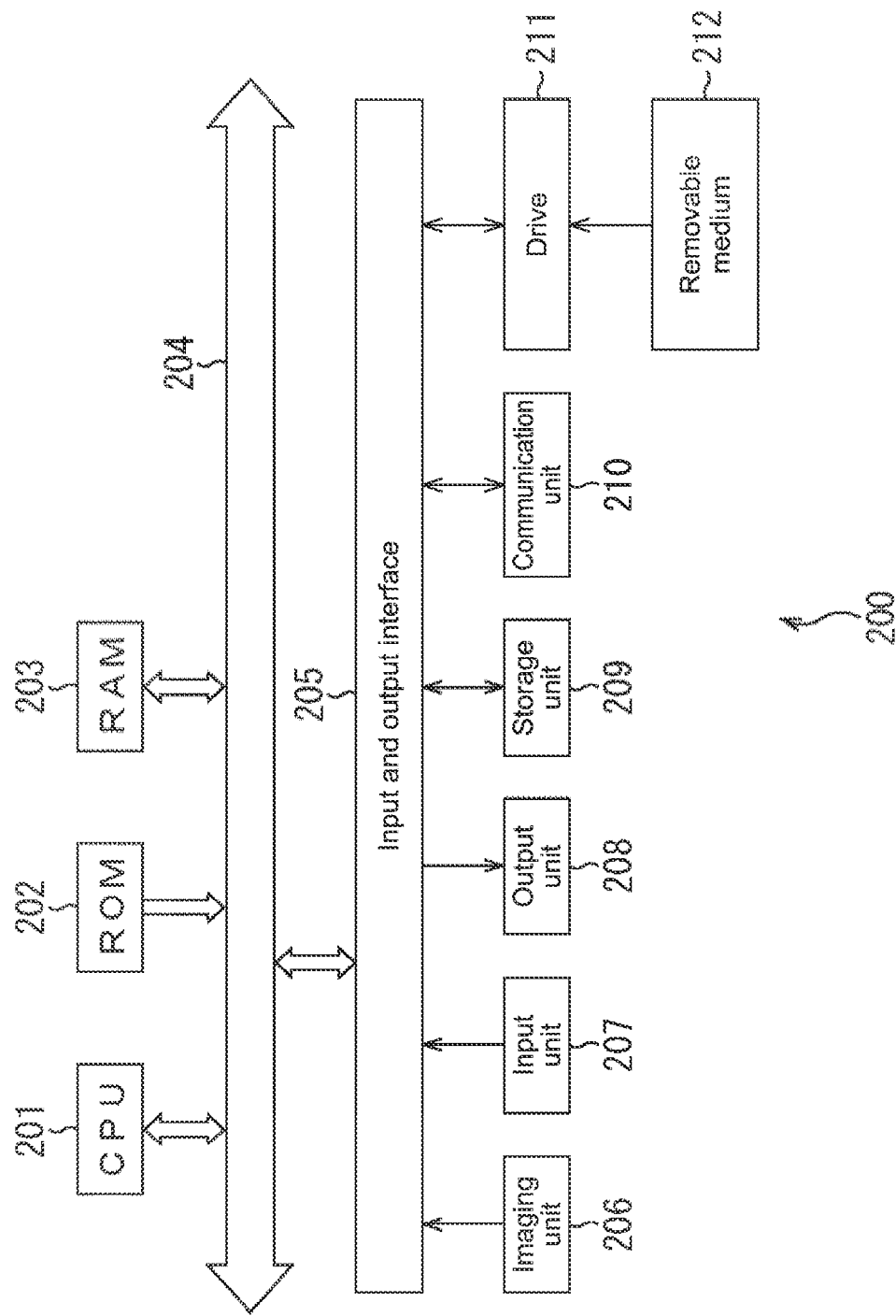
FIG. 17 is a block diagram showing a hardware configuration example of a computer.

FIG. 17 is a block diagram showing a hardware configuration example of a computer that executes the series of processing described above by a program.

In a computer 200, a CPU (Central Processing Unit) 201, a ROM (Read Only Memory) 202, and a RAM (Random Access Memory) 203 are connected to one another by a bus 204.

Additionally, an input and output interface 205 is connected to the bus 204. An imaging unit 206, an input unit 207, an output unit 208, a storage unit 209, a communication unit 210, and a drive 211 are connected to the input and output interface 205.

The imaging unit 206 is constituted by the optical system 41, the image sensor 42, the actuator 49, the image processing unit 43, and the like. The imaging unit 206 acquires image data by light from a subject.

The input unit 207 corresponds to the operation unit 52 and is constituted by a keyboard, a mouse, a microphone, and the like. The output unit 208 is constituted by a display, a speaker, and the like. The storage unit 209 is constituted by a hard disk, a nonvolatile memory, and the like. The communication unit 210 is constituted by a network interface and the like. The drive 211 drives a removable medium 212 such as a magnetic disc, an optical disc, a magneto-optical disc, a semiconductor memory, or the like.

In the computer 200 configured as described above, the series of processing described above is performed by the CPU 201 loading a program stored in the storage unit 209 to the RAM 203 via the input and output interface 205 and the bus 204 and executing the program, for example.

The program executed by the computer 200 (CPU 201) can be provided by, for example, being recorded on the removable medium 212 as a package medium or the like. Further, the program can be provided via a wired or wireless transmission medium such as a local area network, the Internet, or digital satellite broadcasting.

In the computer 200, the program can be installed in the storage unit 209 via the input and output interface 205 by mounting the removable medium 212 to the drive 211. Further, the program can be received in the communication unit 210 via a wired or wireless transmission medium and installed in the storage unit 209. In addition, the program can be previously installed in the ROM 202 or the storage unit 209.

It should be noted that the program executed by the computer 200 may be a program that is processed chronologically along the described order in this specification or may be a program that is processed in parallel or at a necessary timing such as when an invocation is performed.

The effects described herein are merely exemplary ones and are not restrictive ones, and any other effects may be produced.

Further, the embodiments of the present disclosure are not limited to the embodiments described above and can be variously modified without departing from the gist of the present disclosure.

For example, the type of the subject as a focusing target may be a type other than a pupil or a flower (for example, landscape, building, animal, household pet, and cooking). Further, the number of types of the subject as a focusing target can be set to three or more.

Additionally, the button functioning as the selection unit that selects a type of a subject as a focusing target in each imaging may be a button other than the cross key 23 (for example, the custom button 13, the custom button 18, the AEL button 21, and the like). Note that a button functioning as a selection unit in each type of a subject differs. Further, the selection unit may be displayed on the liquid crystal monitor 26 and operated by the cross key 23. In the case where the liquid crystal monitor 26 is configured by a touch panel, a selection unit on the liquid crystal monitor 26 is touched for operation.

Further, the type of the subject selected in each imaging may be not a type of a subject as a focusing target but a type of a subject as a photometry or colorimetry target for selecting optimum exposure, white balance, and the like.

Additionally, in the case where a pupil area can be detected without detecting a face area, it is possible to prevent a face area from being detected in the face detection OFF mode. Further, the imaging apparatus 10 may acquire not the phase difference information but contrast information and achieve focusing on the basis of the contrast information.

It should be noted that the present disclosure can also have the following configurations.

(1) An imaging apparatus, including:
an acquisition unit that acquires an image;
a first selection unit that selects a first type of a subject as a focusing target in each imaging of the image acquired by the acquisition unit;
a first detection unit that detects an area of the subject of the first type from the image in a case where the first type is selected by the first selection unit; and
an area setting unit that sets the area detected by the first detection unit as an in-focus area of the image.

(2) The imaging apparatus according to (1), further including a focusing control unit that controls the acquisition unit to come into focus in the in-focus area set by the area setting unit.

(3) The imaging apparatus according to (1), further including:
an instruction unit that gives an instruction of focusing; and
a focusing control unit that controls the acquisition unit to come into focus in the in-focus area set by the area setting unit, in a case where the instruction of focusing is given by the instruction unit.

(4) The imaging apparatus according to any one of (1) to (3), further including:
a second selection unit that selects a second type of a subject as a focusing target in each imaging of the image acquired by the acquisition unit; and
a second detection unit that detects an area of the subject of the second type from the image in a case where the second type is selected by the second selection unit, in which
the area setting unit sets the area detected by the second detection unit as an in-focus area of the image.

(5) An imaging method for an imaging apparatus, including:
an acquisition step of acquiring an image;
a first selection step of selecting a first type of a subject as a focusing target in each imaging of the image acquired by processing of the acquisition step;
a first detection step of detecting an area of the subject of the first type from the image in a case where the first type is selected by processing of the first selection step; and
an area setting step of setting the area detected by processing of the first detection step as an in-focus area of the image.

(6) A program causing a computer, which controls an imaging apparatus including an acquisition unit that acquires an image and a first selection unit that selects a first type of a subject as a focusing target in each imaging of the image acquired by the acquisition unit, to function as:
a first detection unit that detects an area of the subject of the first type from the image in a case where the first type is selected by the first selection unit; and
an area setting unit that sets the area detected by the first detection unit as an in-focus area of the image.

DESCRIPTION OF SYMBOLS

10 imaging apparatus
11 release button
23A to 23E button
42 image sensor
48 focusing control unit
72 pupil detection unit
73 area setting unit
151 flower detection unit
152 area setting unit

The invention claimed is:

1. A camera apparatus, comprising:
an imager configured to acquire an image;
a first physical button;
a second physical button; and
circuitry configured to:
  detect a face of an object from the acquired image;
  detect an eye of the object from the acquired image based on detection of a first user operation, wherein the first user operation corresponds to a pressing operation of the first physical button;
  set a focus target to the eye of the object, wherein
    a setting to focus on the face of the object is turned off, and
    the focus target is set in a state where a live view image is displayed; and
  set the focus target to a specific object in the acquired image based on detection of a second user operation, wherein
    the second user operation corresponds to a half pressing operation of the second physical button, and
    the specific object corresponds to a closest object to the imager in an imaging direction of the imager.

2. The camera apparatus according to claim 1, wherein the circuitry is further configured to control the imager to set a focus of the camera apparatus at the focus target.

3. The camera apparatus according to claim 1, wherein the circuitry is further configured to:
output a focusing instruction; and
control the imager to set a focus of the camera apparatus at the focus target.

4. The camera apparatus according to claim 1, wherein the circuitry is further configured to:
display, based on detection of the face of the object, a candidate frame that indicates the face of the object as a candidate for the focus target, wherein the candidate frame is superimposed on the image; and
display, based on detection of the eye of the object, a focus frame of a type different from a type of the candidate frame, wherein
the focus frame is superimposed on the image, and
the focus frame indicates the eye of the object as the focus target.

5. The camera apparatus according to claim 4, wherein the circuitry is further configured to display, based on determination that the circuitry fails to detect the eye of the object, the focus frame that indicates the face of the object as the focus target, and the focus frame is superimposed on the image.

6. The camera apparatus according to claim 1, wherein the focus target is set to the eye of the object based on the first user operation.

7. The camera apparatus according to claim 6, further comprising a third physical button and a fourth physical button, wherein the circuitry is further configured to:

display a setting screen to set a shooting-related function based on a third user operation on the third physical button; and move a cursor in a specific direction based on a fourth user operation on the fourth physical button.

8. An imaging method for a camera apparatus, comprising:

acquiring, by an imager, an image;

detecting, by circuitry, a face of an object from the acquired image;

detecting, by the circuitry, an eye of the object from the acquired image based on detection of a first user operation, wherein the first user operation corresponds to a pressing operation of a first physical button of the camera apparatus;

setting, by the circuitry, a focus target to the eye of the object, wherein a setting to focus on the face of the object is turned off, and the focus target is set in a state where a live view image is displayed; and setting, by the circuitry, the focus target to a specific object in the acquired image based on detection of a second user operation, wherein the second user operation corresponds to a half pressing operation of a second physical button of the camera apparatus, and the specific object corresponds to a closest object to the imager in an imaging direction of the imager.

9. The imaging method according to claim 8, further comprising controlling, by the circuitry, the imager to set a focus of the camera apparatus at the focus target.

10. The imaging method according to claim 8, further comprising:

outputting, by the circuitry, an instruction of focusing; and controlling, by the circuitry, the imager to set a focus of the camera apparatus at the focus target.

11. The imaging method according to claim 8, further comprising:

displaying, based on detection of the face of the object, a candidate frame that indicates the face of the object as a candidate for the focus target, wherein the candidate frame is superimposed on the image; and displaying, based on detection of the eye of the object, a focus frame of a type different from a type of the candidate frame, wherein the focus frame is superimposed on the image, and the focus frame indicates the eye of the object as the focus target.

12. The imaging method according to claim 11, further comprising displaying, based on determination that the circuitry fails to detect the eye of the object, the focus frame indicating the face of the object as the focus target, wherein the focus frame is superimposed on the image.

13. The imaging method according to claim 8, wherein the focus target is set to the eye of the object based on the first user operation.

14. The imaging method according to claim 13, wherein displaying a setting screen to set a shooting-related function based on a third user operation on a third physical button of the camera apparatus; and moving a cursor in a specific direction based on a fourth user operation on a fourth physical button of the camera apparatus.

15. A non-transitory computer-readable medium having stored thereon computer-executable instructions that, when executed by a processor in a camera apparatus, cause the processor to execute operations, the operations comprising:

acquiring, by an imager, an image;

detecting, by circuitry, a face of an object from the acquired image;

detecting, by the circuitry, an eye of the object from the acquired image based on detection of a first user operation, wherein the first user operation corresponds to a pressing operation of a first physical button of the camera apparatus;

setting, by the circuitry, a focus target to the eye of the object, wherein a setting to focus on the face of the object is turned off, and the focus target is set in a state where a live view image is displayed; and setting, by the circuitry, the focus target to a specific object in the acquired image based on detection of a second user operation, wherein the second user operation corresponds to a half pressing operation of a second physical button of the camera apparatus, and the specific object corresponds to a closest object to the imager in an imaging direction of the imager.

* * * * *